(12) United States Patent
Gebhardt et al.

(10) Patent No.: US 7,213,470 B2
(45) Date of Patent: May 8, 2007

(54) CORIOLIS MASS FLOWMETER

(75) Inventors: Jorg Gebhardt, Mainz (DE); Frank Kassubek, Rheinfelden (DE); Rene Friedrichs, Ladenburg (DE); Wolfgang Waldi, Nussloch (DE); Steffen Keller, Karlsruhe (DE); Jorg Herwig, Adelebsen (DE); Lothar Deppe, Gottingen (DE); Kuno Hug, Heidelberg (DE); Armin Gasch, Speyer (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 10/972,693

(22) Filed: Oct. 26, 2004

(65) Prior Publication Data
US 2005/0139015 A1    Jun. 30, 2005

(30) Foreign Application Priority Data
Oct. 31, 2003    (DE)    ................ 103 51 311

(51) Int. Cl.
*G01F 1/84*    (2006.01)

(52) U.S. Cl. ............................... 73/861.357

(58) Field of Classification Search ........... 73/861.357, 73/861.356, 861.355
See application file for complete search history.

(56) References Cited

U.S. PATENT DOCUMENTS

| | | | |
|---|---|---|---|
| 5,398,554 A * | 3/1995 | Ogawa et al. ......... | 73/861.357 |
| 5,691,485 A * | 11/1997 | Endo et al. ............ | 73/861.357 |
| 5,945,609 A * | 8/1999 | Kashimura et al. .... | 73/861.357 |
| 6,401,548 B1 * | 6/2002 | Drahm et al. .......... | 73/861.357 |
| 6,782,764 B2 * | 8/2004 | Osawa .................. | 73/861.355 |
| 6,904,667 B2 * | 6/2005 | Lanham et al. ........... | 29/595 |

* cited by examiner

*Primary Examiner*—Jewel Thompson
(74) *Attorney, Agent, or Firm*—Buchanan Ingersoll & Rooney PC

(57) ABSTRACT

Coriolis mass flowmeter with a measuring pipe (2) vibrating in coupled flexural and torsional modes, characterized in that an attachment (20) which is formed rotationally symmetrically with respect to an axis of rotational symmetry and can be made to undergo torsional oscillations of the same frequency, but opposite phase, in relation to the torsional oscillating modes of the measuring pipe (2) is mechanically connected to the measuring pipe (2) and the axis of rotational symmetry of the attachment runs parallel to the straight line (8) (central axis) defined by the center points (4a, 6a) of the cross-sectional areas (4, 6) of the inlet and outlet of the measured section or coincides with this line.

52 Claims, 14 Drawing Sheets

CORIOLIS MASS FLOWMETER

Figure 1:
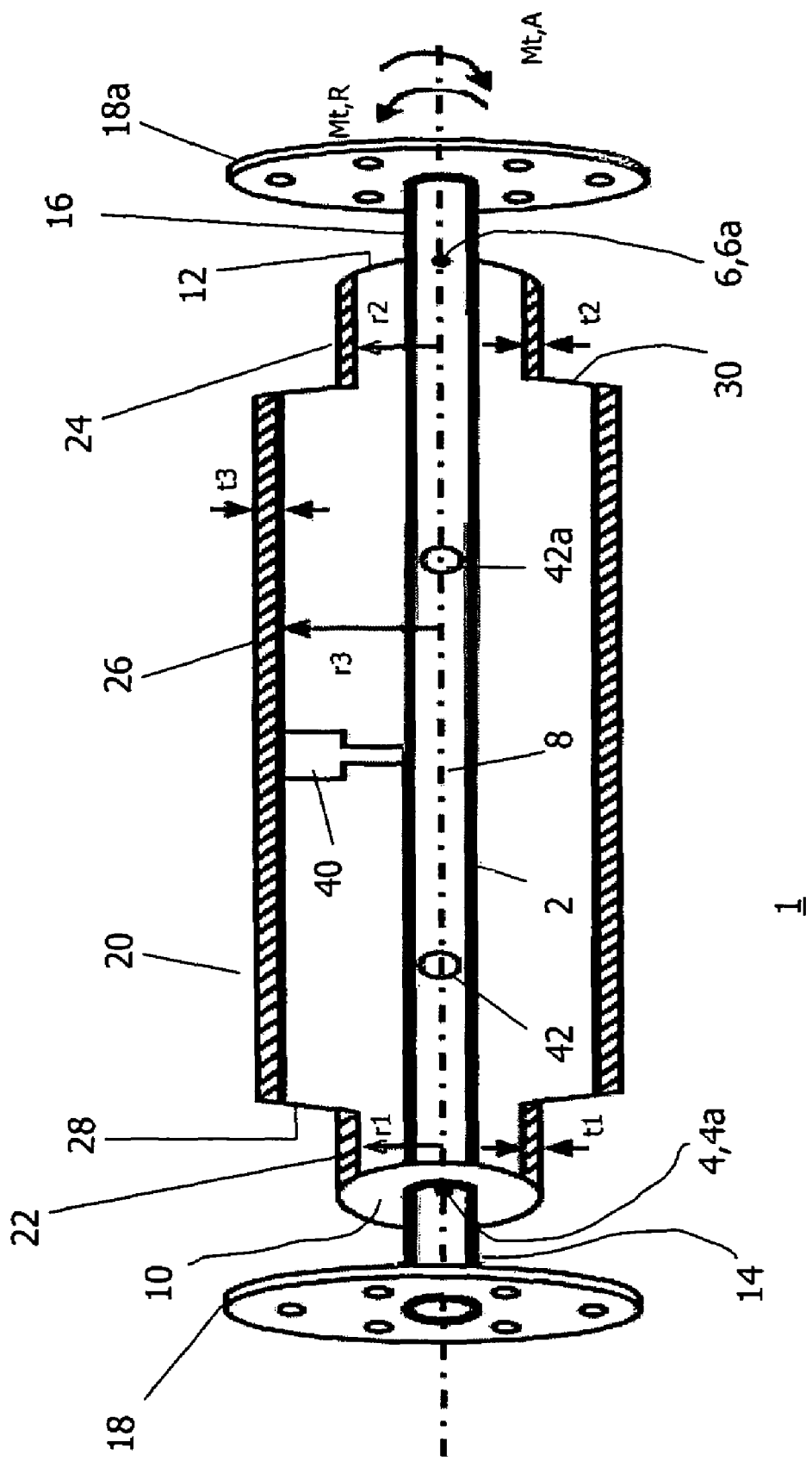

The invention relates to a Coriolis mass flowmeter (CMF) with a measuring pipe vibrating in coupled flexural and torsional modes.

CMFs induce the measuring pipe through which the fluid flows to perform a periodic motion—typically flexural oscillations—and measure the force effect of the fluid on the pipe wall at at least two points. From the phase difference of the measuring signals at the measuring points, the mass flow can be determined.

However, the force effect of the fluid on the pipe wall caused by the flow (this is the Coriolis effect) is very small in comparison with other forces occurring. To be able to distinguish the measuring effect from the background and interference, the device therefore has to meet high requirements with respect to symmetry of the construction, etc. In particular, however, the CMF must be vibrationally isolated as much as possible from its surroundings (in particular the pipeline in which it is installed and the properties of which cannot be influenced). Such isolation is also referred to as "balancing" of the CMF.

In the prior art, there are many attempts to achieve balancing, by using double-pipe constructions and/or bent measuring pipes. These can achieve balancing over a wide range of densities of the fluid. In process engineering terms, however, single-pipe, non-bent measuring pipes are to be preferred. With these, there are three typical approaches (for an overview, cf. the article "Einrohrtechnik bei Coriolis-Massemessern-eine Standortbestimmung" [Single-pipe technique for Coriolis mass meters—locational determination], W. Drahm, atp 42, 7 (2000) p. 20):

Fixed Symmetrical Installation

Here, it is intended to ensure by special installation specifications that the CMF is coupled to the surroundings in a well-defined manner. The devices themselves have a great mass. Disadvantages are increased installation costs, difficult fastenings and great sensitivity of the device to external influences (for example low zero stability).

Flexural Counter-oscillator

The vibration of the measuring pipe is compensated by attaching a flexural counter-oscillator. This oscillates in phase opposition to the measuring pipe and, in the ideal case, eliminates the oscillating motion of the centre of gravity. Then no forces couple out at the edge. Such compensation generally only works for one density of the fluid; with other densities, the mass ratios of the measuring pipe and the counter-oscillator are no longer right and the coupling to the surroundings increases greatly. Then the measuring accuracy also falls.

Torsional Counter-oscillator

Instead of a flexural counter-oscillator, the natural frequency in bending is coupled to a torsional oscillation of the pipe by eccentrically attaching masses. It has been proposed to achieve this by attaching to the measuring pipe a number of cantilevered masses, the centres of gravity of which lie in a common plane running perpendicularly in relation to the plane of the flexural oscillation through the longitudinal axis of the measuring pipe, but do not generally lie on this longitudinal axis. An alternative possibility is to attach a rigid eccentric trough, as shown in US 2002/0117010A1. Since both modes of oscillation (flexural and torsional oscillating modes) are influenced in a similar way by the fluid mass, it is found that edge forces, i.e. flexural and torsional forces, can be compensated over a great range of densities. The balanced part of the measuring pipe is also referred to hereafter as the measured section. The measurement data are to be recorded only within the measured section balanced in such a way.

However, the balancing as proposed is obtained at the expense that, on account of the torsional oscillation, symmetrical torques (moments of torsion) act along the pipe axis on the ends of the measuring pipe on the inlet and outlet sides. Symmetrical means here that the moments of torsion on the inlet and outlet sides are of the same amount, but are oriented either in the same direction or in opposite directions. These axial moments of torsion have the effect that an undesired vibrational coupling to the surroundings of the CMF continues to take place.

It is therefore the object of the present invention to develop a CMF of the generic type further in such a way that axial moments of torsion are also compensated.

The object is achieved by the characterizing features of claim 1 or by the characterizing features of claim 46.

According to the invention, an attachment which is formed rotationally symmetrically with respect to an axis of rotational symmetry and can be made to undergo torsional oscillations of the same frequency, but opposite phase, in relation to the torsional oscillating modes of the measuring pipe is mechanically connected to the measuring pipe. The axis of rotational symmetry of the attachment runs parallel to the straight line defined by the centre points of the cross-sectional areas of the inlet and outlet of the measured section, which is referred to hereafter as the central axis for short, or coincides with this line. In the case of an entirely straight measuring pipe, the central axis coincides with the centre line of the measuring pipe and the axis of rotational symmetry of the measuring pipe.

Rotationally symmetrical means here symmetrical in the sense of a rotational symmetry of order n. n is in this case a natural number. A body has a rotational symmetry of order n if its transforms are identical figures when it is rotated about the axis of rotational symmetry by an angle of $360°/n$. For example, an elongated cuboid with square base areas has a rotational symmetry of order 4 with respect to a central axis running parallel to the direction of the longitudinal extent. This is so because the transforms of the cuboid are identical figures at rotational intervals of 90°. An elongated cuboid with rectangular end faces has a rotational symmetry of order 2. A solid or hollow cylinder, for example a measuring pipe, with homogeneous mass distribution, would have, as an extreme case of a rotational symmetry of order n, a rotational symmetry of an infinite order, since an identical figure of the hollow or solid cylinder is obtained with every rotation by any desired angle. This is also referred to as rotational symmetry.

The attachment may be mirror-symmetrical with respect to a plane of symmetry oriented perpendicularly in relation to the axis of rotational symmetry and intersecting the central axis at the centre of the measured section. Mirror-symmetrical means that the attachment forms an image of itself when it is reflected at the plane of symmetry.

Also very advantageous is an embodiment in which at least one further compensating part is attached to the measuring pipe to compensate for flexural and/or torsional forces. As described above, these may be eccentric masses, an eccentric, rigid trough or other compensating parts known per se, by means of which, as described above, the flexural and torsional forces of the measuring pipe in the region of the measured section are compensated.

The part of the measuring pipe which is compensated by the at least one compensating part with respect to flexural and/or torsional forces and the part which is compensated by the attachment with respect to the moment of torsion may be congruent, or one of the two parts encloses the other. The larger of the two parts in each case defines the measured section. The measured section is that part of the measuring pipe in which the latter is balanced. It may be of the same length as the measuring pipe itself. However, it may also be shorter than the measuring pipe, that is to say comprise only a segment of the measuring pipe.

In an advantageous refinement, the attachment is connected to the measuring pipe on the inlet and outlet sides. The attachment may be connected to the measuring pipe at the ends of the measured section on the inlet and outlet sides, or within the measured section.

Attached to the ends of the measured section on the inlet and outlet sides there may be pipe extensions on the inlet and outlet sides, to which the flanges for incorporating the CMF in a process pipeline are then attached. The measuring pipe is then made up of the measured section and the pipe extensions.

The dividing of the measuring pipe into a measured section and pipe extensions described above is to be understood here as functional. In actual fact, the measured section with the pipe extensions may be a single component, or it may be made up of a plurality of segments.

The advantage of the arrangement according to the invention is that the moments of torsion of the measuring pipe and of the attachment at the connecting points between the measuring pipe and the attachment can be compensated exactly if the quality of the measuring pipe torsional oscillation and the quality of the torsional oscillation of the attachment are identical. If the qualities differ, the moments of torsion of the measuring pipe and of the attachment at the connecting points between the measuring pipe and the attachment are compensated almost exactly.

A CMF according to the invention is consequently balanced outwardly, in the regions outside the measured section, with respect to the moments of torsion.

If a CMF according to the invention is constructed with regard to the measuring pipe, as already proposed earlier and described above under the subheading "Torsional counteroscillator", a CMF which is very well-balanced at the end zones of the measured section with regard to all flexural and torsional forces and moments occurring can be constructed.

The attachment may enclose the measuring pipe in the region of the measured section, but it may also be arranged outside the measuring pipe. What is important is the equality of the torsional oscillating frequencies of the measuring pipe and the attachment.

If the attachment encloses the measuring pipe, there is, in other words, attached to the measuring pipe of the CMF essentially a kind of inner supporting housing, the oscillating modes of which are tuned in such a way that it has a torsional mode of the same frequency but opposite phase as the torsional mode of the measuring pipe. The axis of rotational symmetry of the attachment then coincides with the central axis of the measuring pipe. The inner housing and the actual measuring pipe oscillate with opposite phases, and the moments of torsion about the pipe axis compensate one another. The main condition that is required for compensation is the equality of the frequencies. The connection between the measuring pipe and the attachment can be realized for example by the attachment being welded to the measuring pipe on the inlet and outlet sides.

If the attachment does not enclose the measuring pipe, the axis of rotational symmetry of the attachment runs parallel to and at a distance from the central axis of the measuring pipe. A rigid connection between the measuring pipe and the attachment may then be realized for example by welding a rigid plate onto the measuring pipe respectively on the inlet and outlet sides and welding the attachment onto the plates.

In the case of a CMF according to the invention, the measuring pipe may also be bent in virtually any desired shape. It could for example be bent in a U-shaped, V-shaped or S-shaped manner. If they are induced to perform coupled flexural and torsional oscillations, such measuring pipes that are bent in any desired manner also couple out moments of torsion at their ends.

In the case of a bent measuring pipe, the central axis no longer coincides with the centre line of the measuring pipe and the axis of rotational symmetry of the measuring pipe over the entire length of the measuring pipe. Also in the case of a bent measuring pipe, both the central axis and the axis of rotational symmetry of the measuring pipe run through the centre points of the cross-sectional areas of the inlet and outlet of the pipe.

The attachment may in this case comprise at least a first segment, on the inlet side, a second segment, on the outlet side, and a third, central segment, each segment being formed rotationally symmetrically with respect to the axis of rotational symmetry of the attachment. The segments are preferably configured in such a way that the segments on the inlet and outlet sides act essentially as torsion springs and the central segment acts essentially as an inert mass.

The functional principle of the invention can be illustrated by considering an analogy with a system of coupled spring-mass oscillators. In such an analogy, the measuring pipe corresponds to a mass which is coupled to the flanges by means of a spring. In the analogy, the flanges are a mass. Similarly, the attachment may be regarded as a mass (the central segment), which is likewise coupled to the flanges by means of a spring (the first and second segments). If the mass representing the measuring pipe is then made to undergo oscillations, the spring coupling has the effect that both the mass representing the flanges and the mass representing the attachment are induced to perform oscillations. By applying laws and rules that are known to a person skilled in the art of mechanics, it can be shown that, with a suitable design of the parameters determining the oscillating properties of the attachment, the oscillation coupling takes place in such a way that the attachment oscillates with the same frequency and opposite phase in relation to the measuring pipe in such a way that the oscillation amplitudes of the attachment and the measuring pipe automatically become equal and opposite in such a way that the mass representing the flanges remains at rest, and so no forces and moments are exerted on the flanges. The system is then balanced.

Among the factors determining the vibrational properties of the attachment is its torsional moment of area with respect to the axis of rotational symmetry. The torsional moment of area is a known parameter in mechanics and is described for example in Dubbel, Taschenbuch für den Maschinenbau [Pocketbook for mechanical engineering], eighteenth edition, Springer-Verlag Berlin, 1995, pages C27–C29. As indicated there for example in Table 7 on page C29, the torsional moment of area of thin-walled hollow bodies with a constant wall thickness is proportional to the product of the square of the area enclosed by the cross-sectional centre line multiplied by the wall thickness, divided by the size of the cross-sectional centre line. The angle of twist is inversely proportional to the torsional moment of area.

In an advantageous embodiment of the invention, the torsional moment of area of the central segment of the attachment is greater than the torsional moments of area of the segments on the inlet and outlet sides. In the case of such an embodiment, it is then ensured that the segments on the inlet and outlet sides act as torsion springs and the central segment acts as a mass which twists little within itself.

Furthermore, in the case of the CMF according to the invention, the frequency and phase of the torsional mode of oscillation of the attachment can be set by the ratio of the amounts of the torsional moments of area of the central segment and of the segments on the inlet and outlet sides and also by the position of the transitions between the central segment and the segments on the inlet and outlet sides. The transitions between the central segment and the segments on the inlet and outlet sides may in this case take place in steps or continuously.

If the attachment encloses the measuring pipe in the manner of an inner housing, such an inner housing according to the invention is distinguished by the fact that as a whole it is not rigid and not eccentric with respect to the central axis. Although the central segment may be designed in such a way that it is rigid, this is not the case for the segments on the inlet and outlet sides, which of course, as already mentioned, perform the function of torsion springs.

Furthermore, irrespective of whether or not the attachment encloses the measuring pipe, other modes of oscillation, in particular flexural oscillating modes, of the attachment must be far away from the excitation frequency in the frequency space, in order not to produce any undesired couplings which reduce the balancing effect. Flexural oscillating modes can be set for example by means of the mass and mass distribution in the attachment. In particular if the attachment is a hollow body, one of the ways in which the vibrational properties can be set is by the amount of the wall thickness.

A very advantageous way of realizing a CMF according to the invention therefore provides that the segments of the attachment are hollow bodies. For example, the segments may be hollow cylinders or hollow cuboids with thick or thin walls. The segments are then connected to one another by connecting elements, for example plates, to be designed on the basis of recognized rules of the art.

In the choice of hollow cylinders as segments of the attachment, the cylindrical piece of pipe forming the central segment has a greater radius than those forming the first and second segments. The frequency and/or phase of the attachment can then be set by the position of the transitions between the central piece of cylindrical pipe and the pieces of cylindrical pipe on the inlet and outlet sides and the ratio of the radius of the central piece of cylindrical pipe to the radii of the pieces of cylindrical pipe on the inlet and outlet sides.

An attachment according to the invention may also be designed in a general way such that the individual segments do not have the same diameter and the same wall thickness at all points, that is for example also comprise convexly and/or concavely shaped surface portions. The individual segments could also in turn be made up of subsegments and/or of composite bodies. However, it must be ensured that the conditions described above according to the invention with regard to the rotational symmetry of the attachment as a whole and the torsional oscillating properties of the attachment can be maintained.

A very advantageous refinement of a CMF according to the invention is characterized in that the excitation system is attached to the attachment. The sensors for sensing the oscillation may also be attached to the attachment.

A further very advantageous embodiment of the invention provides that adjusting elements, for example variable masses with which a trimming of the vibrational properties of the attachment can subsequently be carried out, are attached to the attachment.

Also according to the invention is a CMF in which at least two attachments which are formed axially symmetrically with respect to the central axis and can be made to undergo torsional oscillations of the same frequency, but opposite phase, in relation to the torsional oscillating modes of the measuring pipe are mechanically connected to the measuring pipe.

An attachment in the form of a circular ring on the inlet side and one on the outlet side are advantageously attached to the measuring pipe at the end zones of the measuring pipe on the inlet and outlet sides by means of radial, elongated connecting elements. The elongated connecting elements may be bars, beams or pipes. In other words, it could be said that the attachments look like spoked wheels. The torsional oscillating properties of the attachment on the inlet and outlet sides can then be set by means of the dimensioning of the elongated connecting elements.

Further advantageous refinements and improvements of the invention and further advantages can be taken from the further subclaims.

Figure 2:
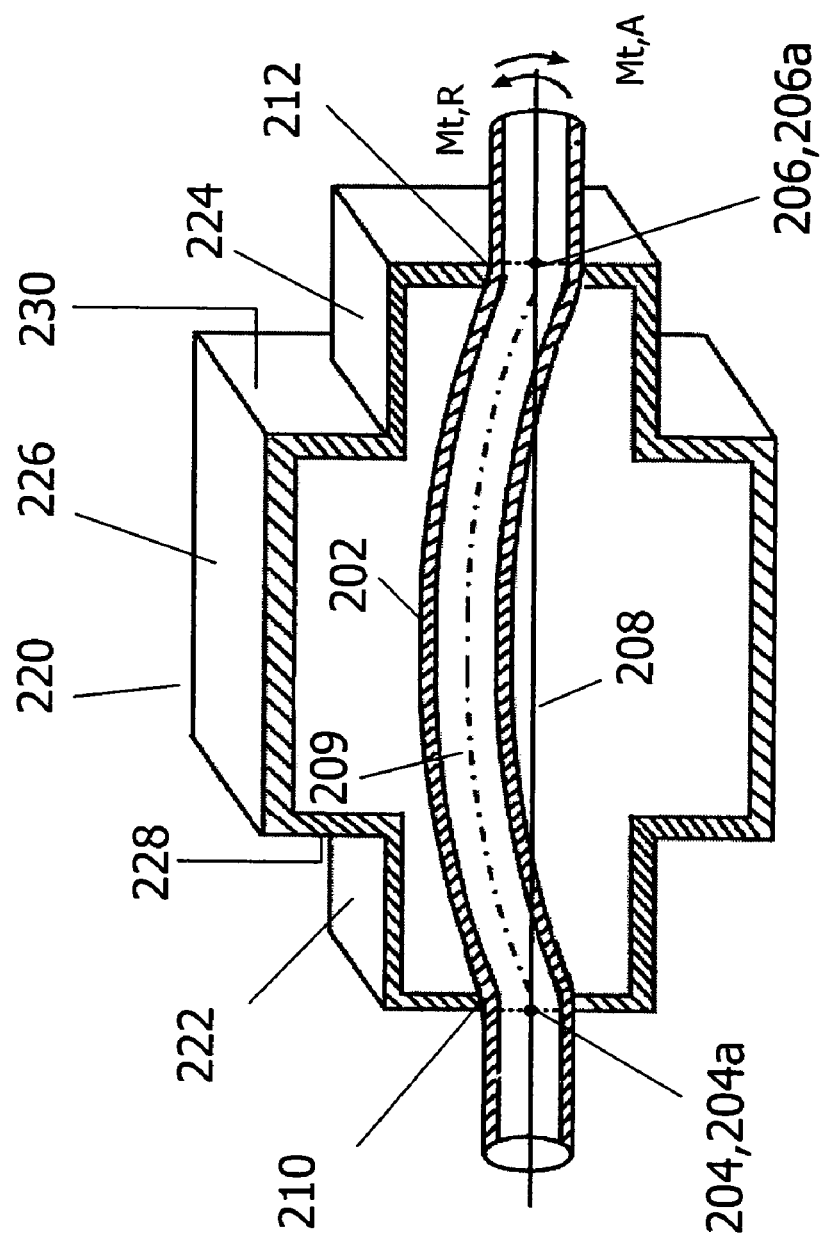
Figure 3:
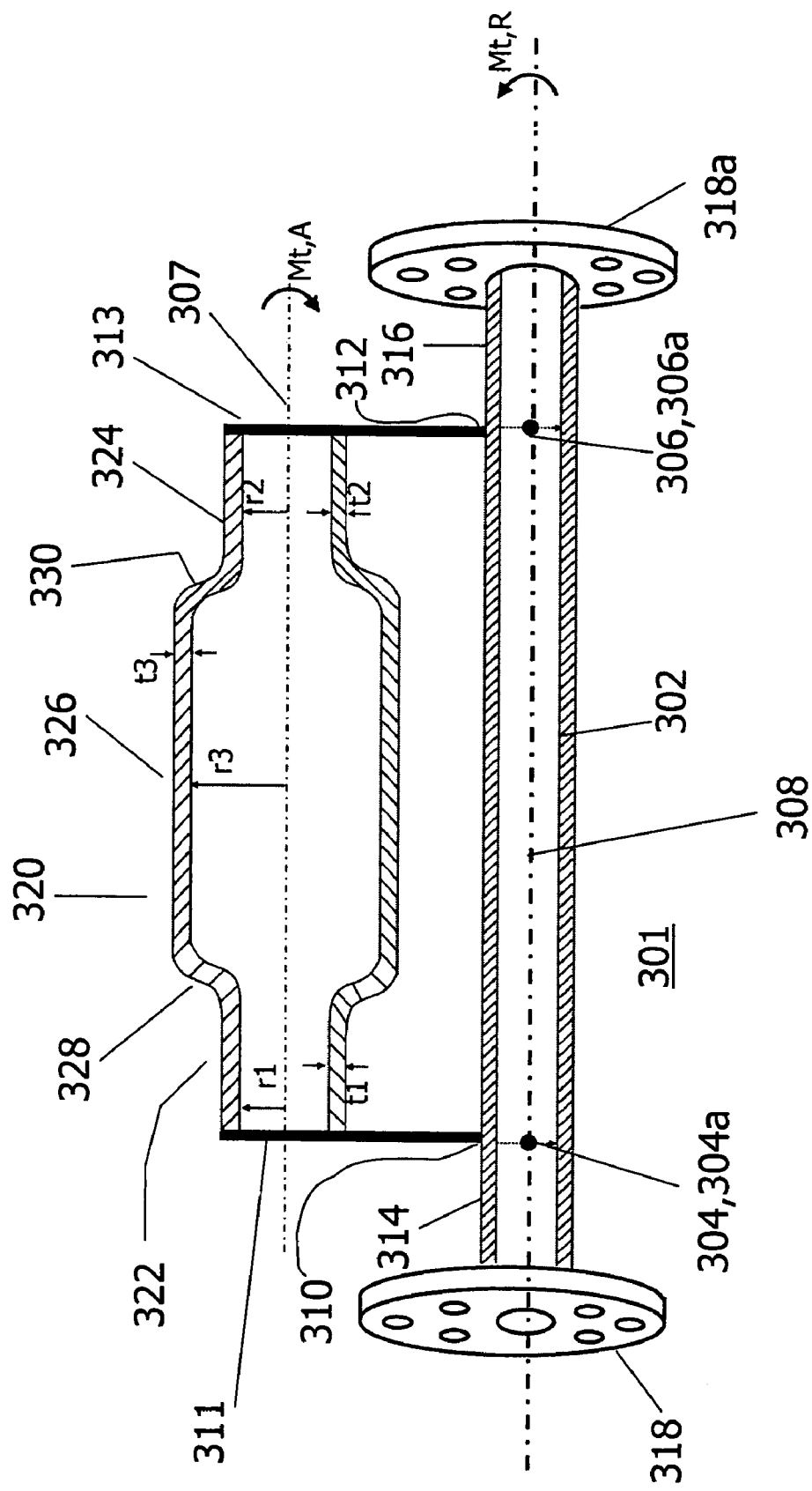
Figure 4:
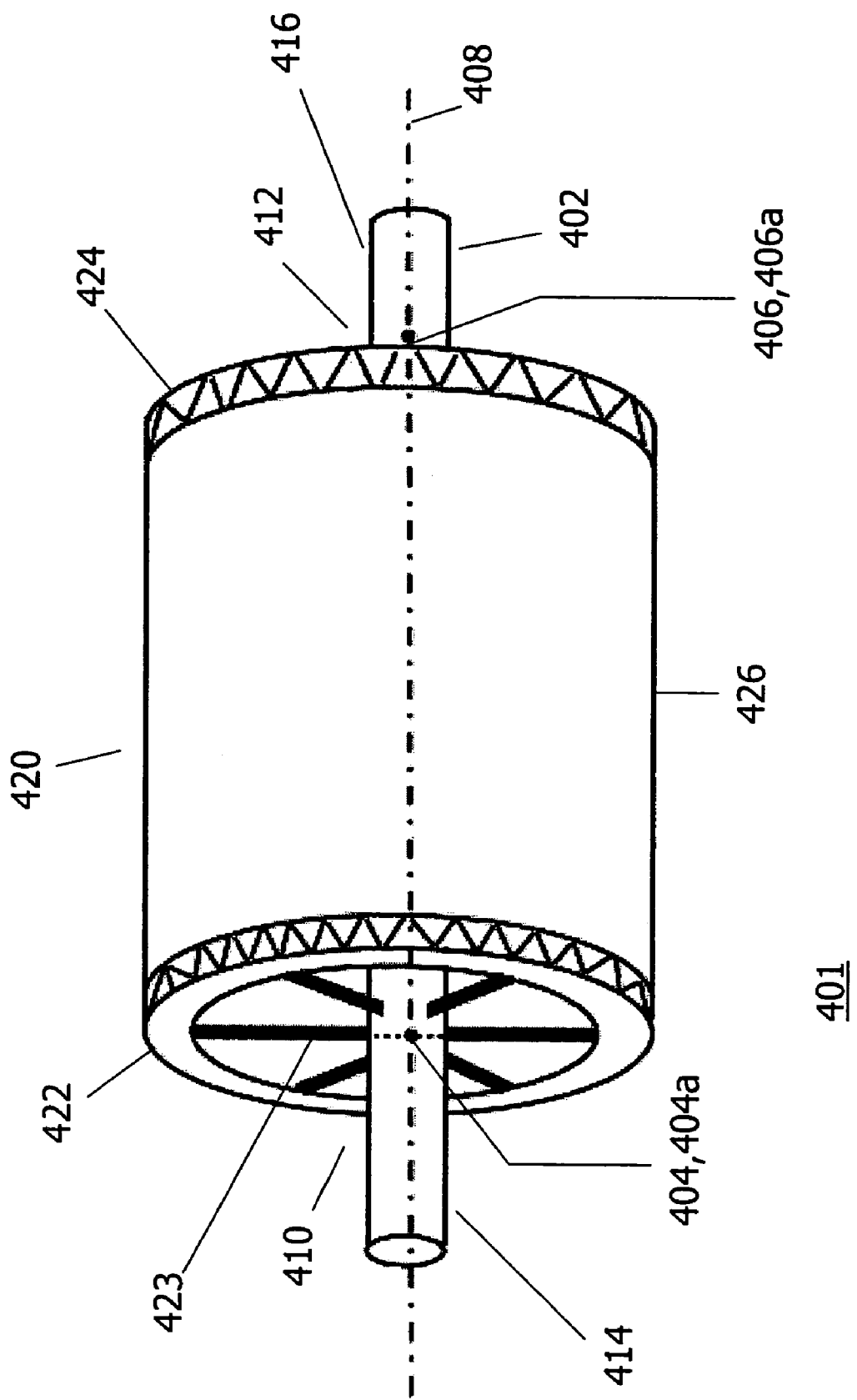
Figure 5:
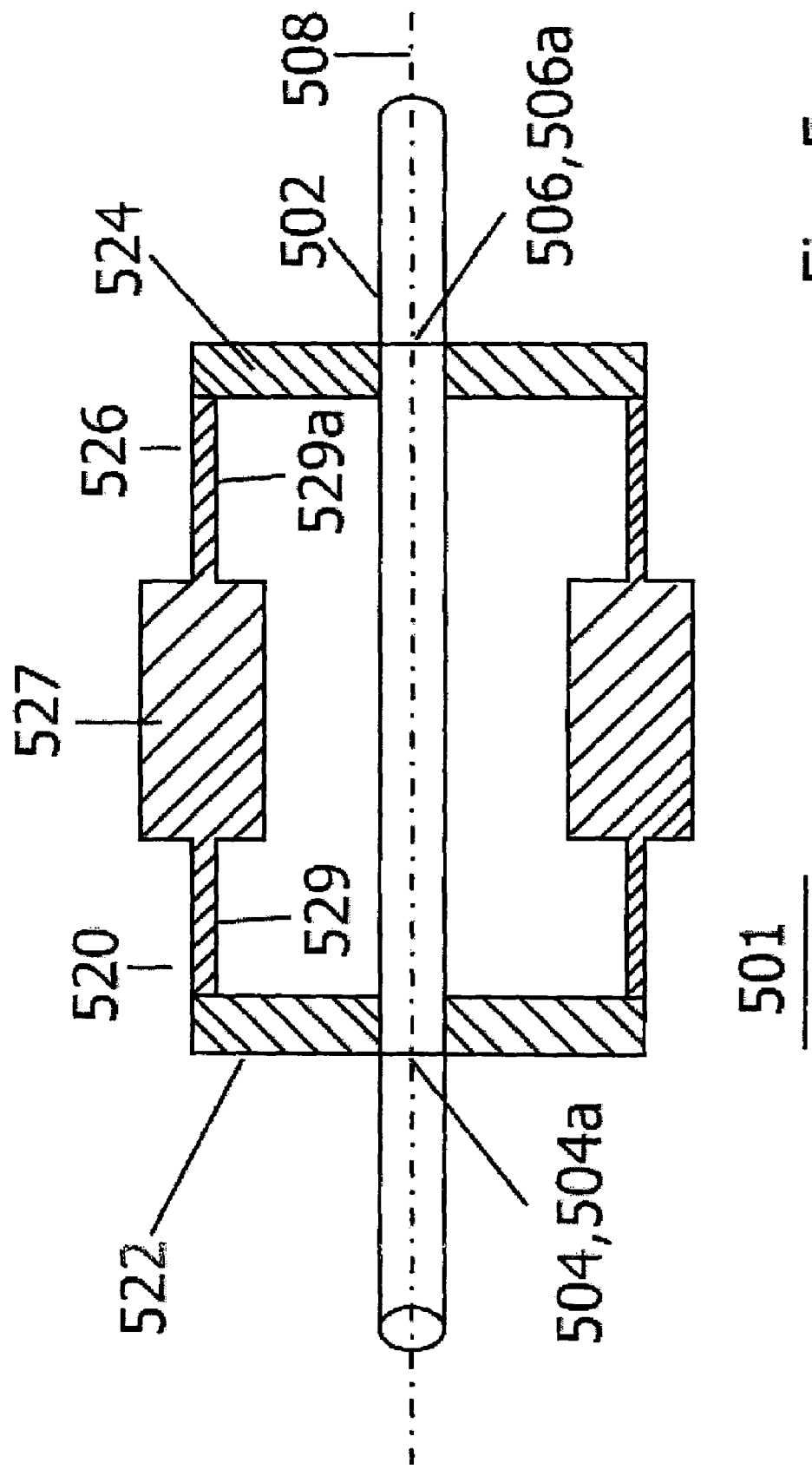
Figure 6:
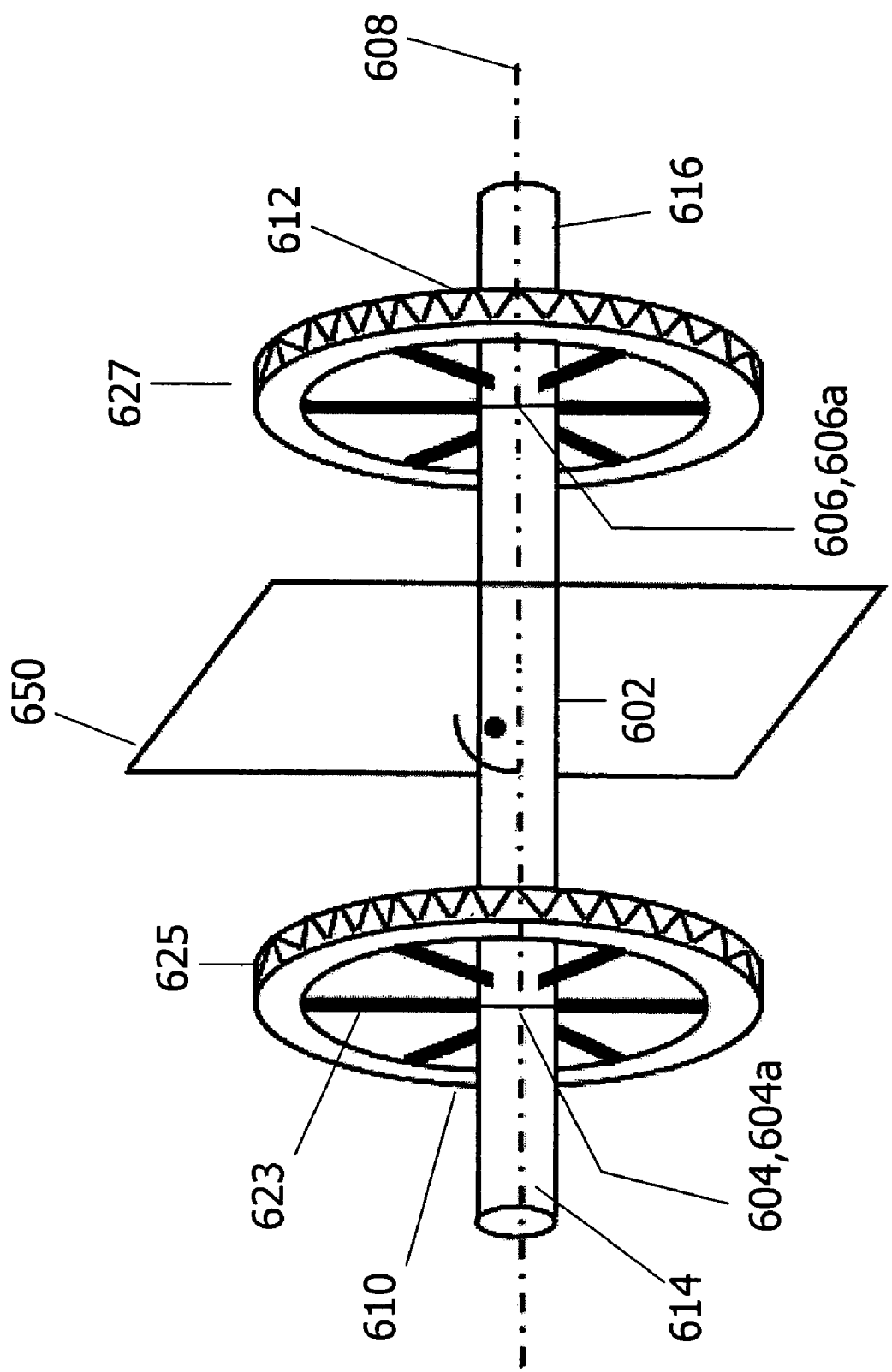
Figure 7:
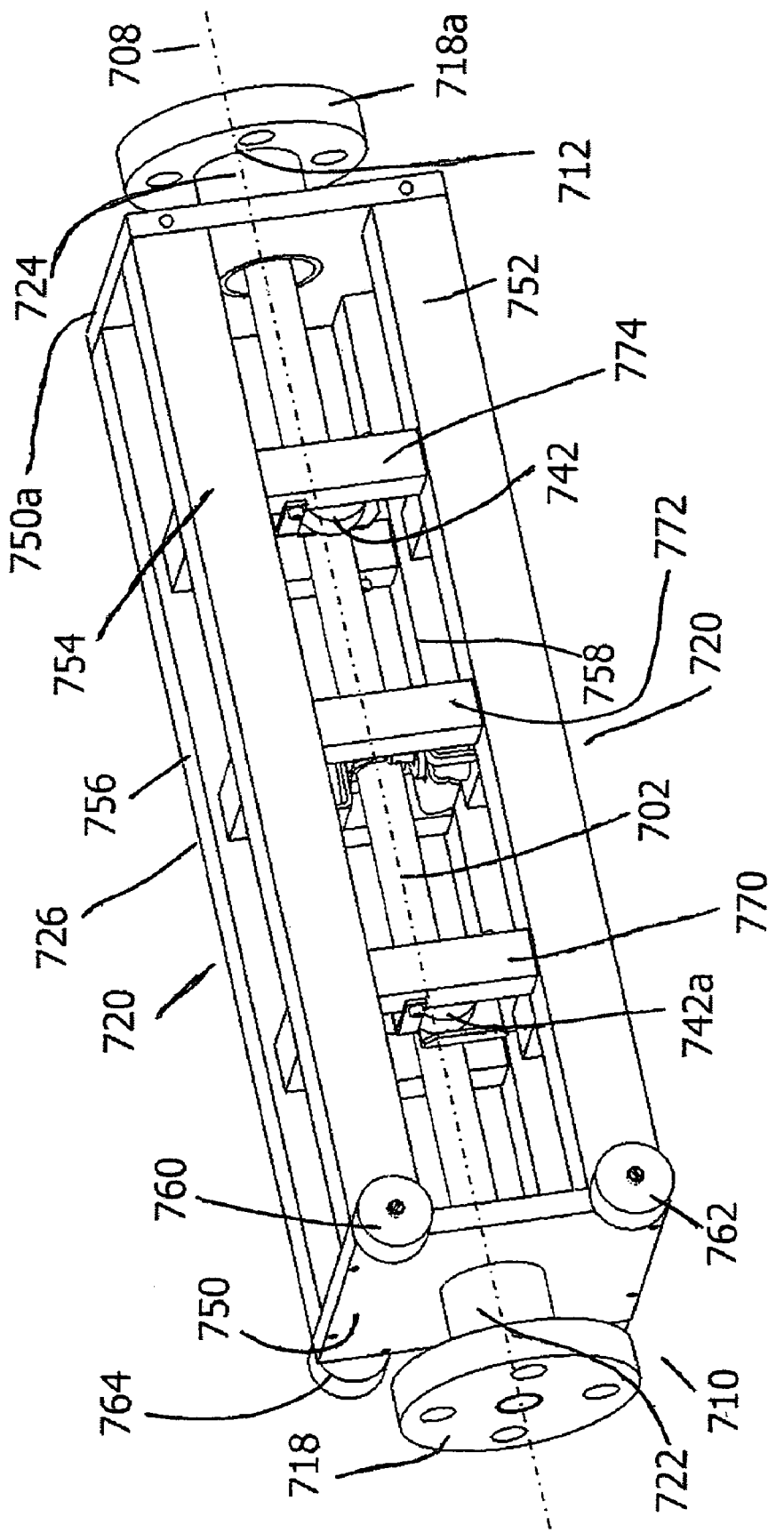
Figure 8:
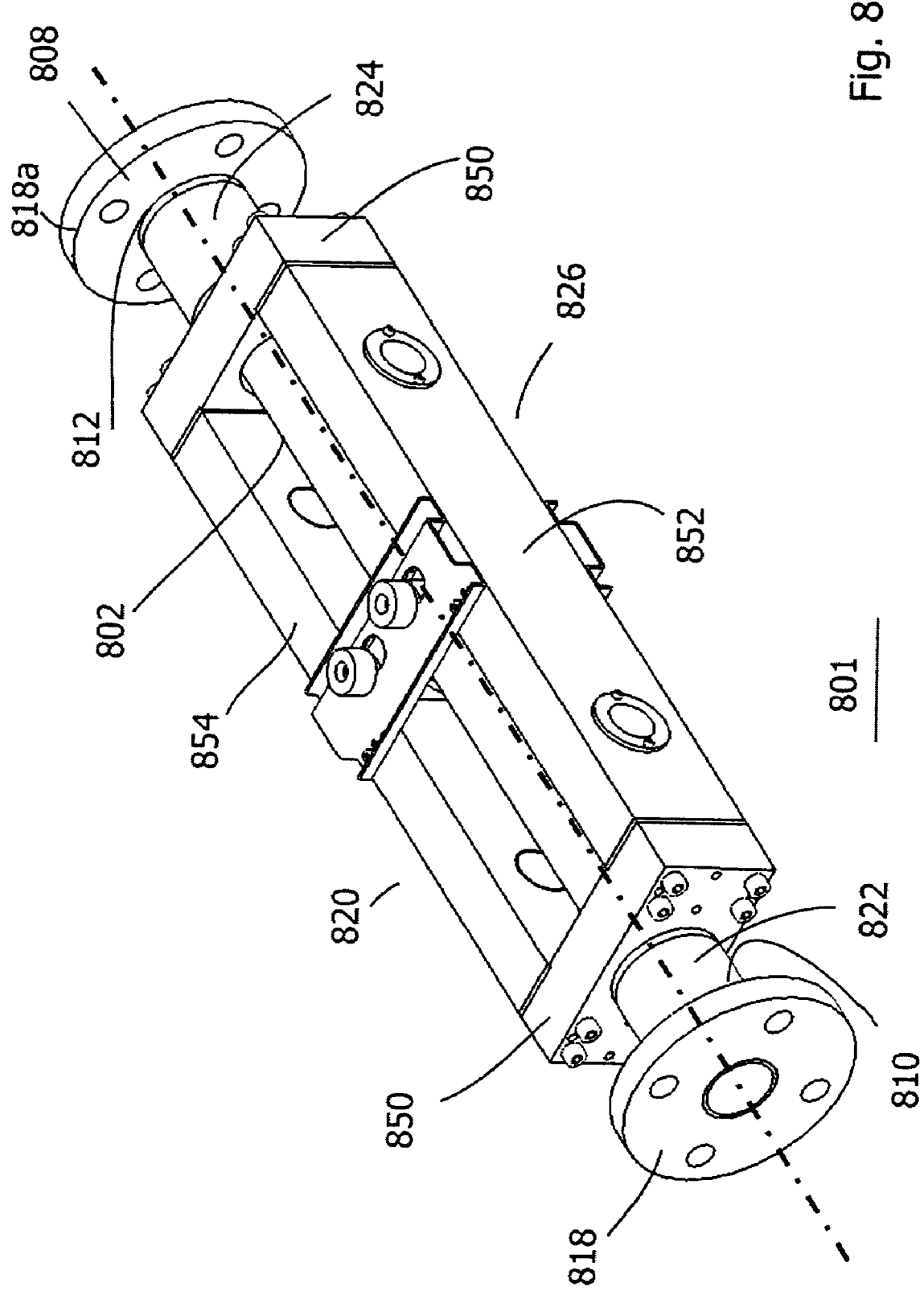
Figure 9:
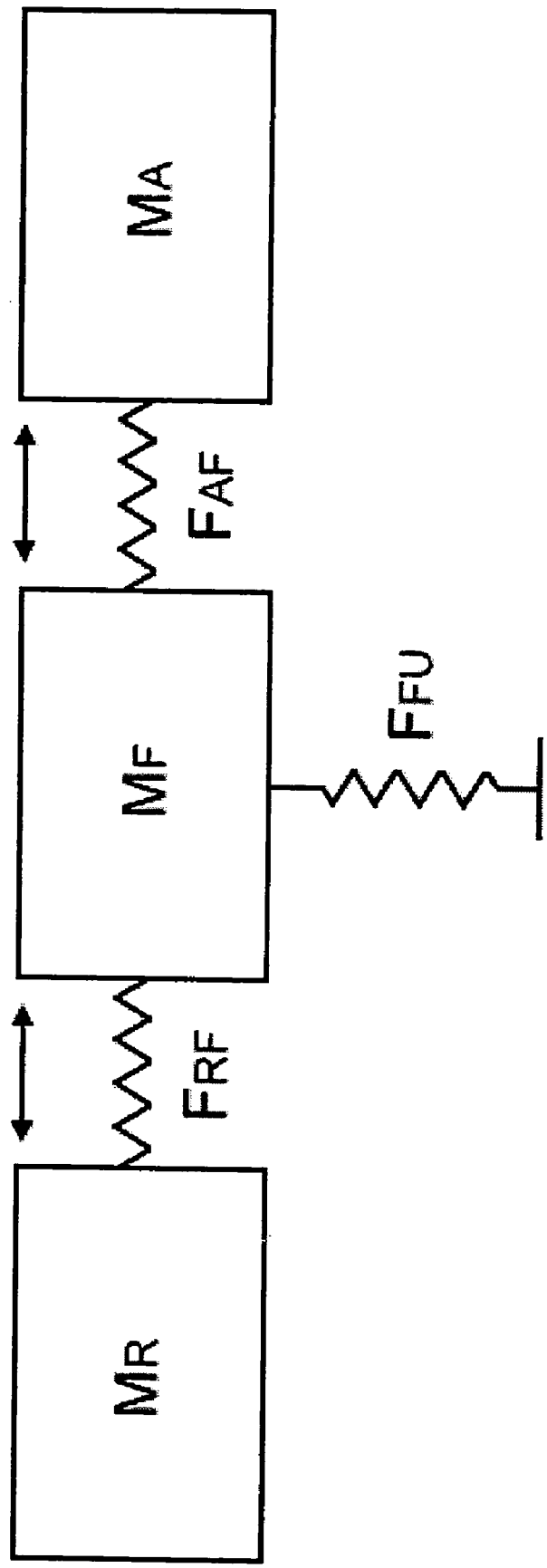
Figure 10:
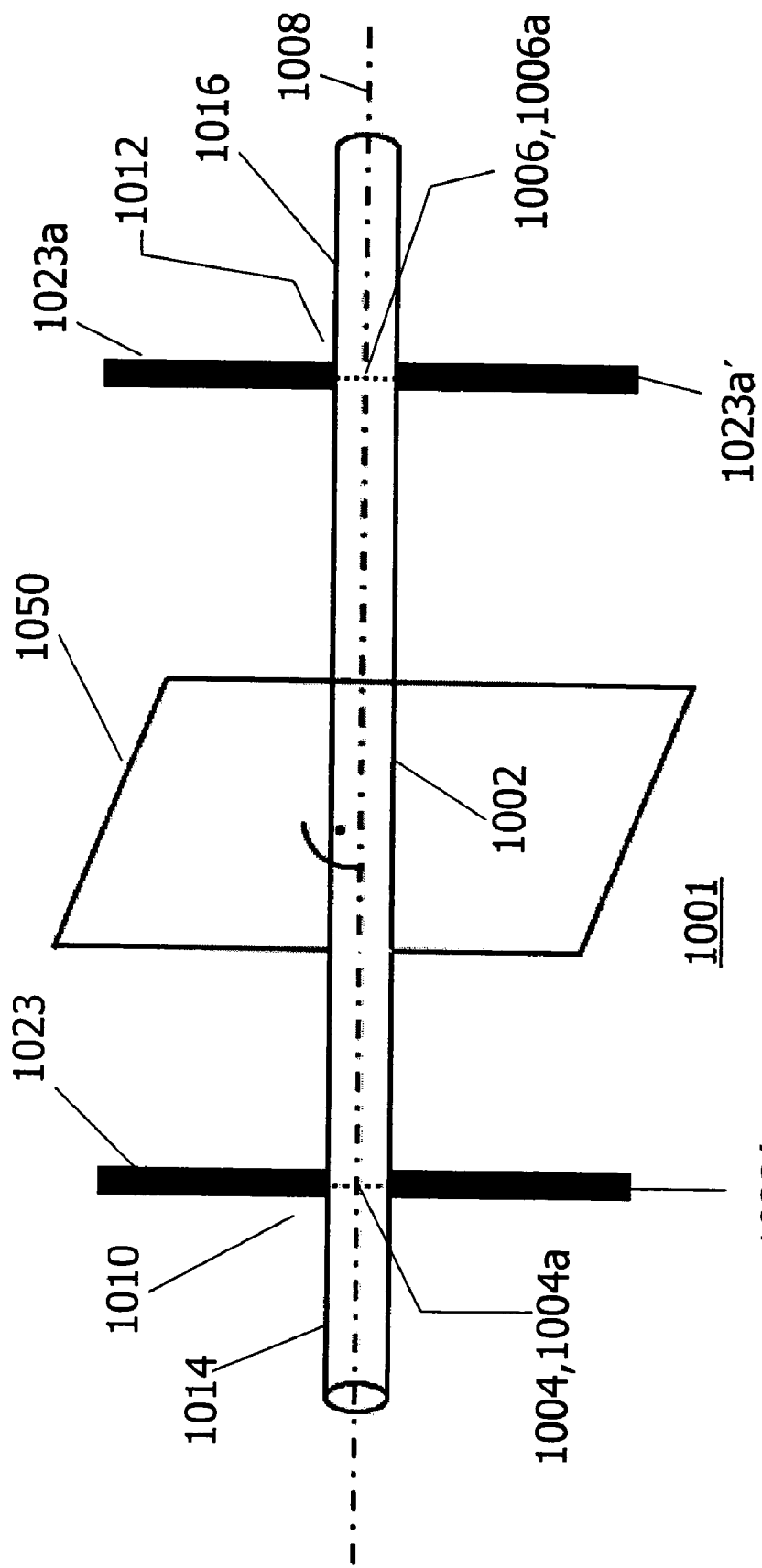
Figure 11:
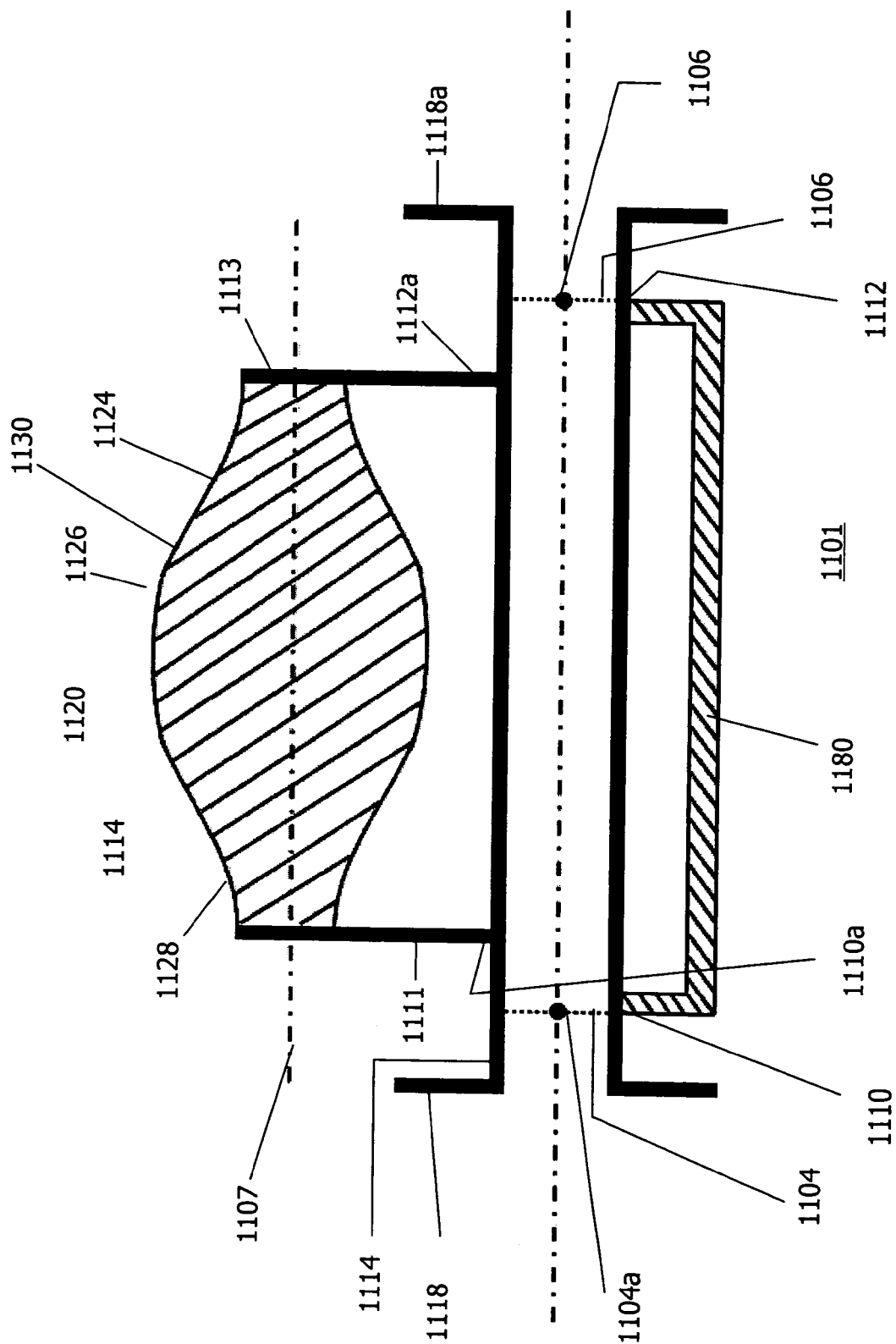
Figure 12:
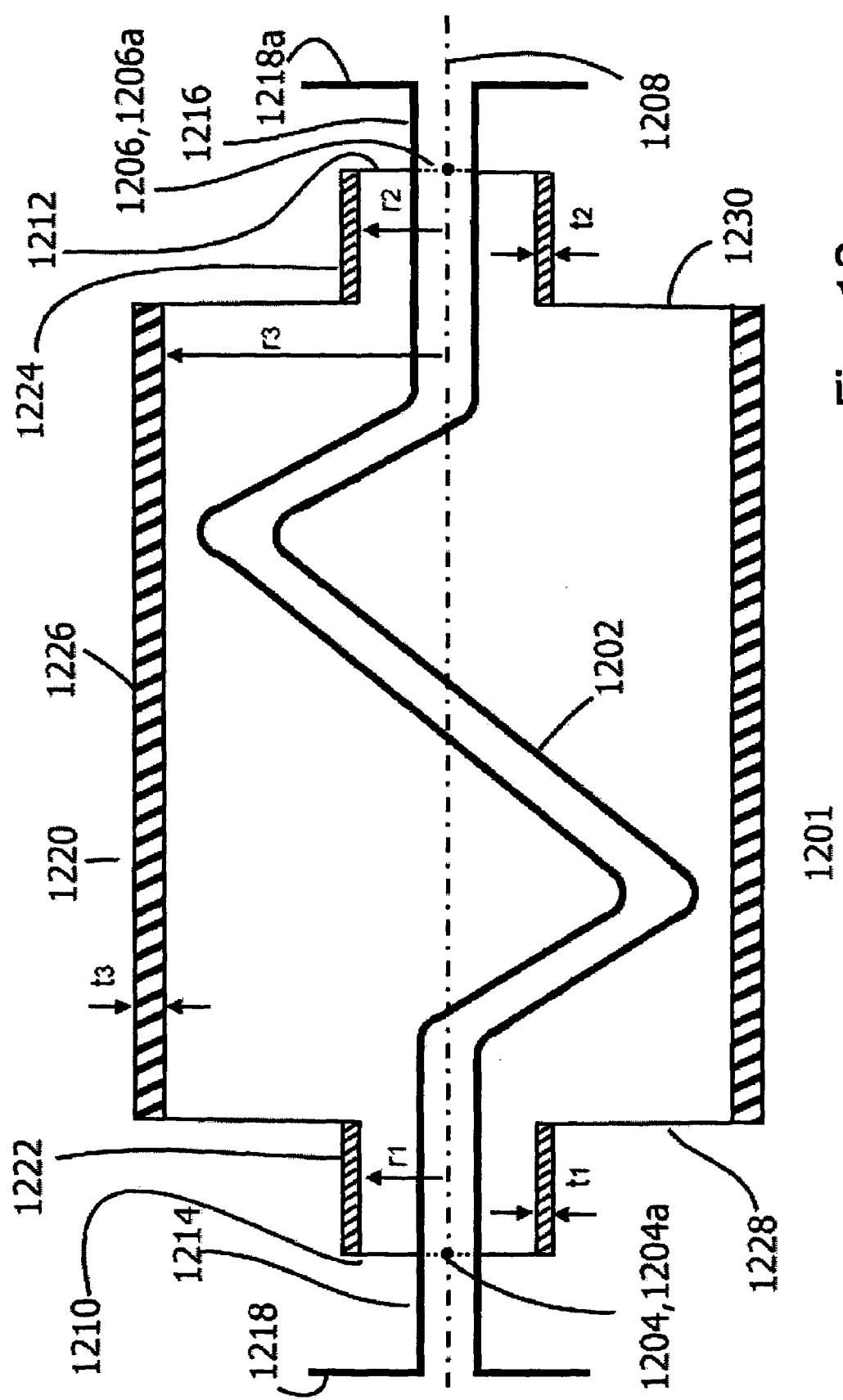
Figure 13:
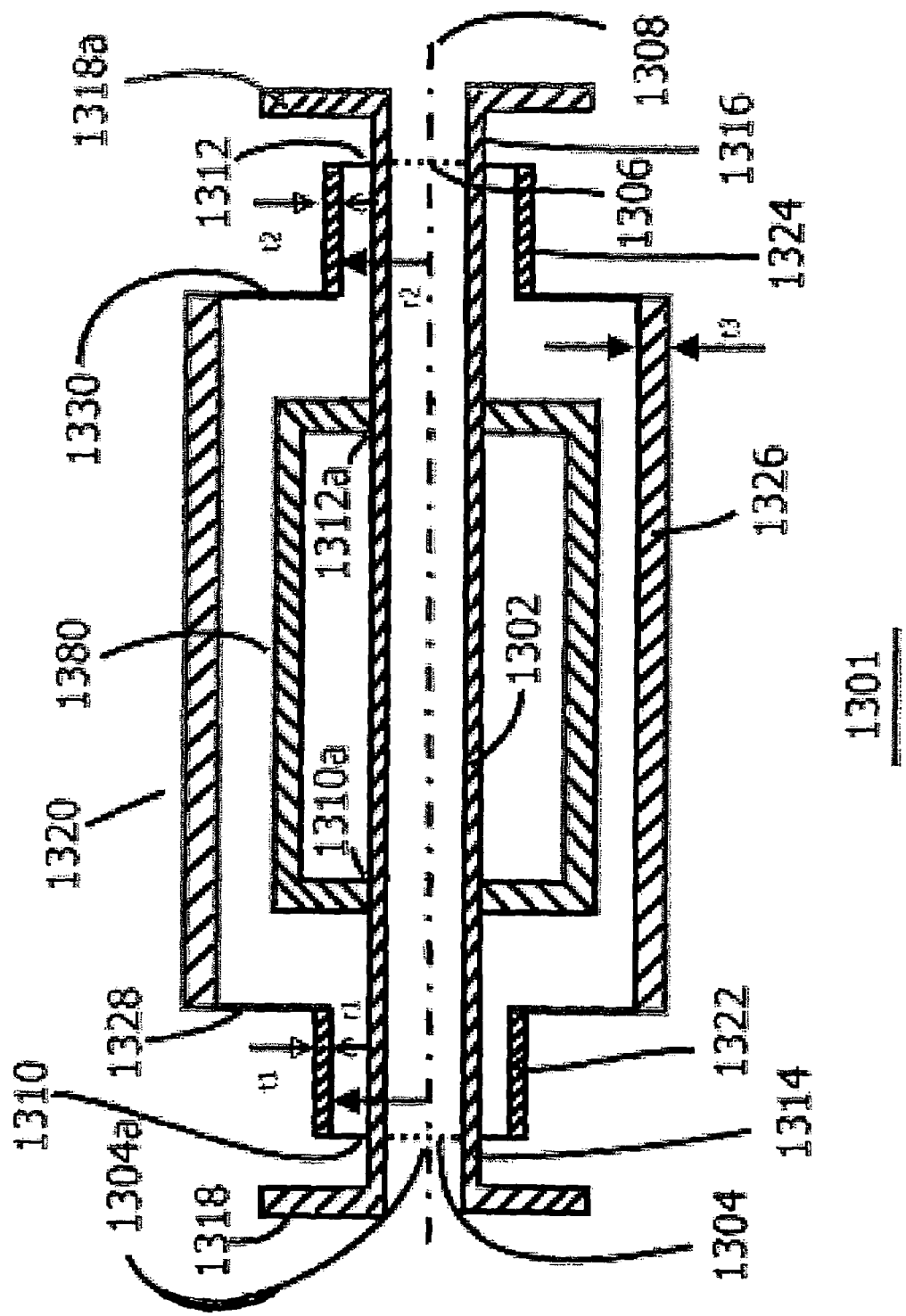
Figure 14:
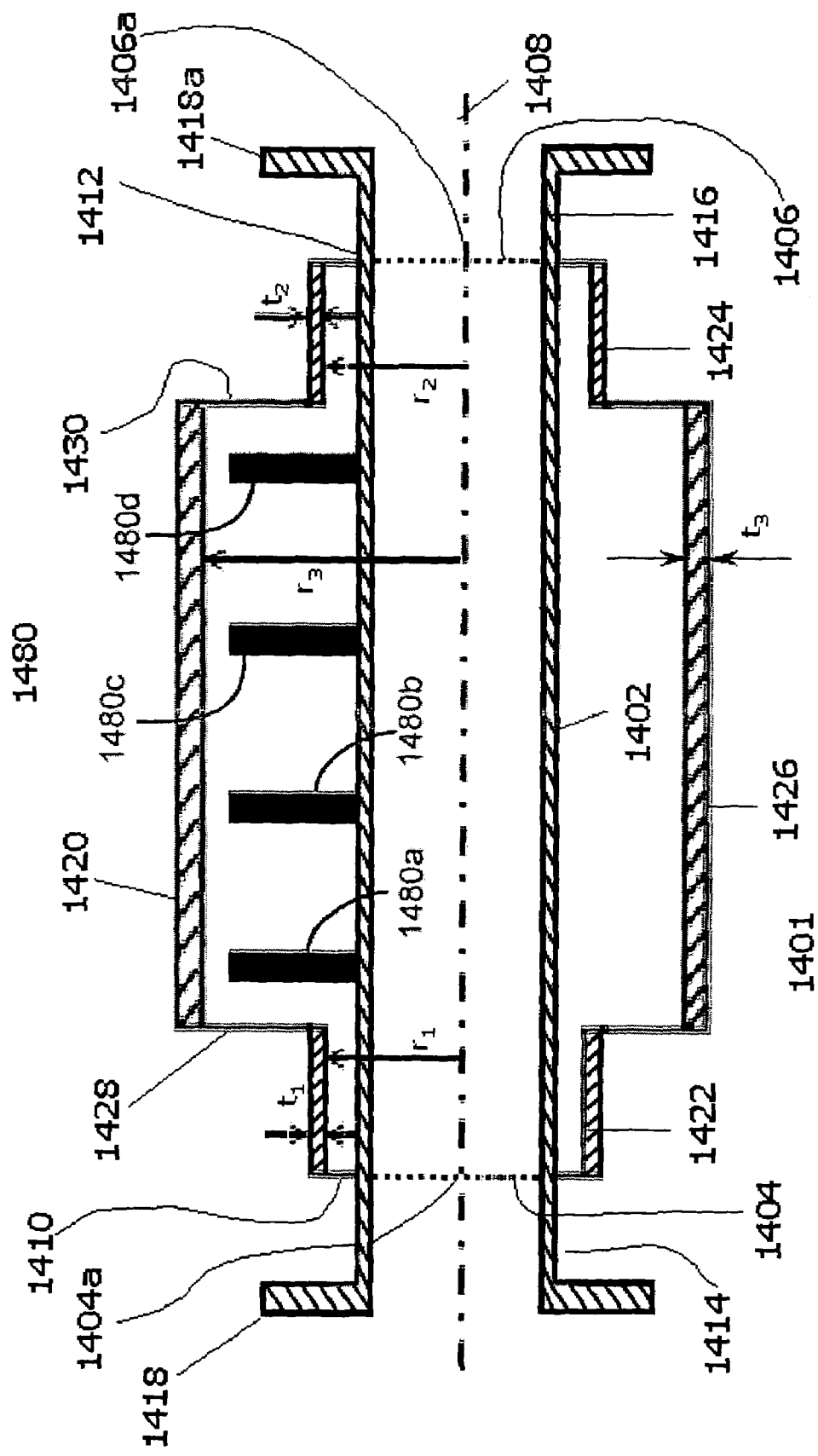

The invention and further advantageous refinements and improvements of the invention as well as further advantages are to be explained and described in more detail on the basis of the drawings, in which thirteen exemplary embodiments of the invention are represented and in which:

FIG. 1 shows a first embodiment of the invention, in which the attachment comprises three pieces of pipe, FIG. 2 shows a second embodiment of the invention, in which the attachment comprises three hollow cuboids, FIG. 3 shows a third embodiment of the invention, in which the attachment is an axially symmetrical body with continuous transitions between zones of different cross section, FIG. 4 shows a fourth embodiment of the invention, in which the attachment comprises two annular bodies in the form of spoked wheels, connected by a cylindrical casing, FIG. 5 shows a fifth embodiment of the invention, in which the attachment comprises two connected discs and heavy masses in the centre, FIG. 6 shows a sixth embodiment, in which two attachments in the form of spoked wheels are attached to the measuring pipe, FIG. 7 shows a seventh embodiment, in which the attachment comprises four hollow bodies held on plates running perpendicularly in relation to the measuring pipe axis, FIG. 8 shows an eighth embodiment, in which the attachment comprises two hollow bodies held on plates running perpendicularly in relation to the measuring pipe axis, FIG. 9 shows a simplified spring-mass model to illustrate the functional principle, FIG. 10 shows a ninth embodiment, in which two pairs of elongated elements are attached to the measuring pipe as attachments, FIG. 11 shows a tenth embodiment, in which a further compensating part is also attached to the measuring pipe along with the attachment, FIG. 12 shows an eleventh embodiment, in which the measuring pipe is bent in an S-shaped manner, FIG. 13 shows a twelfth embodiment, in which a further compensating part is likewise attached to the measuring pipe along with the attachment, and FIG. 14 shows a thirteenth embodiment, in which four eccentric masses are attached to the measuring pipe as further compensating parts.

FIG. 1 shows a Coriolis mass flowmeter 1 with a single, straight measuring pipe 2. The measuring pipe 2 is produced from one piece, but is functionally divided into a pipe extension 14 on the inlet side, a pipe extension 16 on the outlet side and the measured section in between, bounded by a measured-section inlet cross-sectional area 4 and a measured-section outlet cross-sectional area 6. A central axis 8 of the measuring pipe 2 is defined by their centre points 4a, 6a. The central axis 8 coincides here with the axis of rotational symmetry of the measuring pipe 2. Attached to the pipe extensions 14, 16 are the flanges 18, 18a for incorporating the meter 1 in a process pipeline system.

Connected to the measuring pipe 2 is an attachment 20, which surrounds the measuring pipe 2 in the region of the measured section on all sides. The attachment 20 is a rotationally symmetrical hollow body, made up of three hollow cylinders, which represent a first segment 22, on the inlet side, a second segment 24, on the outlet side, and a third, central segment 26 of the attachment 20. Its axis of rotational symmetry coincides with the central axis 8 of the measuring pipe 2.

The connection between the central segment 26 and the segments 22, 24 on the inlet and outlet sides is produced by welded plates at transitions 28, 30. The inner radii $r_1$, $r_2$ of the segments 22, 24 on the inlet and outlet sides are smaller than the inner radius $r_3$ of the central segment 26. On the other hand, the wall thickness $t_3$ of the central segment 26 is greater than the wall thicknesses $t_1$, $t_2$ of the segments 22, 24 on the inlet and outlet sides.

The measuring pipe 2 may, as customary in the prior art, consist of metal, for example titanium. The attachment 20 may also consist of metal. It is welded onto the measuring pipe at the ends 10, 12 of the measured section on the inlet and outlet sides.

Attached to the inside wall of the central segment cylinder 26 is an excitation system 40, which is in operative connection with the measuring pipe 2 and by which the measuring pipe 2 can be made to undergo coupled flexural/torsional oscillations. As already proposed earlier, the excitation system may comprise for example one or more suitably arranged coils through which alternating current flows, with armatures that are connected to the measuring pipe being movably arranged in them. In a way corresponding to the frequency of the alternating current, the armature or armatures are periodically pushed out of the coil and pulled back into the coil, whereby the measuring pipe 2 is induced to perform flexural oscillations. The attachment of eccentric masses to the measuring pipe 2 at specific points, as already proposed earlier, or the measuring pipe itself having an inhomogeneous mass distribution has the effect that coupled to the flexural oscillation is a torsional oscillation, so that overall the measuring pipe 2 is made to undergo a coupled flexural and torsional oscillation by the excitation system. As likewise already proposed, the measuring pipe 2 may also be initially induced by the excitation system 40 to perform torsional oscillations, to which flexural oscillations are then coupled by means of eccentric cantilevered masses or inhomogeneous mass distribution in the measuring pipe 2, so that in turn the measuring pipe 2 is induced by the excitation system 40 to perform coupled flexural and torsional oscillations.

The torsional oscillating mode of the attachment 20 can be set with regard to its frequency and phase in relation to the torsional oscillating mode of the measuring pipe 2 by suitable fixing of the following parameters: the ratio of $r_3$ to $r_2$ or $r_3$ to $r_1$, the distances of the transitions 28, 30 from the ends of the measured section 10, 20 on the inlet and outlet sides and the wall thicknesses $t_3$, $t_1$, $t_2$. With a correspondingly suitable choice, the torsional oscillating mode of the attachment 20 then has the same frequency, but opposite phase in relation to the torsional oscillating mode of the measuring pipe, so that then the moment of torsion of the measuring pipe $M_{tR}$ occurring at the ends of the measured section 10, 12 on the inlet and outlet sides is equal and opposite to the moment of torsion $M_{tA}$ of the attachment 20 occurring there. The two moments of torsion compensate each other; the meter 1 is very well balanced at the ends of the measured section 10, 12 on the inlet and outlet sides.

By suitable choice of the mass ratio of the mass of the attachment to the mass of the measuring pipe, it is additionally possible to achieve the effect that other modes of oscillation of the attachment 20, in particular flexural oscillating modes, are far away from the excitation frequency in the frequency space and consequently do not produce any undesired couplings in relation to the torsional oscillating modes of the attachment 20.

FIG. 9 explains the functional principle of the compensation for moments of torsion in an analogous example with linearly coupled spring-mass systems. In such an analogy, the measuring pipe corresponds to a mass $M_R$, which is coupled to the flanges by means of a spring $F_{RF}$. In the analogy, the flanges are a mass $M_F$, providing a coupling via a further spring $F_{FU}$ to the surroundings, that is the process pipeline into which the meter is incorporated.

In a simplified representation, the attachment may be regarded as a mass $M_A$ (that is the central segment 20), which is likewise coupled to the flanges by means of a spring $F_{AF}$ (that is the first and second segments). If the mass $M_R$ representing the measuring pipe is then made to undergo oscillations, the spring coupling via $F_{RF}$ and $F_{AF}$ has the effect that both the mass $M_F$ representing the flanges and the mass $M_A$ representing the attachment are induced to perform oscillations. By applying laws and rules that are known to a person skilled in the art of mechanics, it can be shown that, with a suitable design of the parameters determining the oscillating properties of the attachment, the oscillation coupling takes place in such a way that the attachment oscillates with the same frequency and opposite phase in relation to the measuring pipe in such a way that the oscillation amplitudes of the attachment and the measuring pipe are also automatically set in such a way that the mass $M_F$ representing the flanges remains at rest, and so no forces and moments are exerted on the flanges. The system is then balanced.

Sensors 42, 42a for sensing the oscillation of the pipe are attached to the measuring pipe 2.

FIG. 2 shows an alternative embodiment of a mass flowmeter 1a according to the invention. The same, similar or similarly acting elements or assemblies of the example that is shown in FIG. 2 bear the same reference numerals as in FIG. 1, increased by 200. The measuring pipe 202 is slightly bent between the ends 210, 212 of the measured section on the inlet and outlet sides. A slightly bent measuring pipe has the advantage over a completely straight measuring pipe that, if there are changes in length of the measuring pipe as a result of temperature fluctuations, linear compensation is possible to reduce the occurrence of stresses in the measuring pipe. In the case of the slightly bent measuring pipe 202, the measuring pipe centre line 209 and the central axis 208 defined by the centre points 204a, 206a of the pipe inlet and pipe outlet cross-sectional areas 204, 206 do not coincide.

Connected to the measuring pipe 202 is an attachment 220, with the result that the attachment 220 surrounds the measuring pipe 202 in the region of the measured section on all sides. The attachment 220 is a hollow body which has rotational symmetry of order 2 and is made up of hollow cuboids, which represent a first segment 222, on the inlet side, a second segment 224, on the outlet side, and a third, central segment 226 of the attachment 220. Its axis of rotational symmetry coincides with the central axis 208 of the measuring pipe 202.

The connection between the central segment 226 and the segments 222, 224 on the inlet and outlet sides is produced by welded plates at transitions 228, 230.

Otherwise, the compensation for moments of torsion takes place in a way analogous to the example described in FIG. 1. The segments 222, 224 on the inlet and outlet sides act as torsion springs with a rectangular cross section and the central segment 226 acts as a mass with a rectangular cross section. However, apart from the cross-sectional shape, the relationships described under FIG. 1 can be transferred analogously to the example that is shown in FIG. 2.

Attached to the inside wall of the attachment 220 there is in turn an excitation system, but it is not represented here for reasons of overall clarity. Similarly, sensors for picking up the oscillation signals are attached to the measuring pipe, but they are likewise not represented here for reasons of overall clarity. The excitation system and the sensors are attached in a way similar to that shown in FIG. 1.

FIG. 3 shows a further alternative embodiment of a mass flowmeter 301 according to the invention. The same, similar or similarly acting elements or assemblies of the example that is shown in FIG. 3 bear the same reference numerals as in FIG. 1, increased by 300.

FIG. 3 shows a Coriolis mass flowmeter 301 with a single, straight measuring pipe 302. The measuring pipe 302 is produced from one piece, but is functionally divided into a pipe extension 314 on the inlet side, a pipe extension 316 on the outlet side and the measured section in between, bounded by a measured-section inlet cross-sectional area 304 and a measured-section outlet cross-sectional area 306. A central axis 308 of the measuring pipe 302 is defined by their centre points 304a, 306a. The central axis 308 coincides here with the axis of rotational symmetry of the measuring pipe 302. Attached to the pipe extensions 314, 316 are the flanges 318, 318a for incorporating the meter 301 in a process pipeline system.

Connected to the measuring pipe 302 is an attachment 320, which is arranged outside the measuring pipe 302. The attachment 320 is a rotationally symmetrical hollow body with a first segment 322, on the inlet side, a second segment 324, on the outlet side, and a third, central segment 326. Its axis of rotational symmetry 307 runs parallel to the central axis 308 of the measuring pipe 302, but does not coincide with it but instead runs at a distance from the central axis 308 of the measuring pipe 302.

The attachment 320 consists of metal and is produced for example by a casting technique. Formed on at the same time between the central segment 326 and the segments 322, 324 on the inlet and outlet sides are transitional parts 328, 330. The surface of the attachment 320 shows a continuous transition between the three segments with correspondingly concavely and convexly shaped transitions.

A rigid connection between the measuring pipe 302 and the attachment 320 is realized by respectively welding a rigid plate 311, 313 onto the measuring pipe 302 on the inlet and outlet sides and welding the attachment 320 onto the plates 311, 313.

The typical average inner radii $r_1$, $r_2$ of the segments 322, 324 on the inlet and outlet sides are smaller than the typical average inner radius $r_3$ of the central segment 336. On the other hand, the wall thickness $t_3$ of the central segment 326 is greater than the wall thicknesses $t_1$, $t_2$ of the segments 322, 334 on the inlet and outlet sides.

The torsional oscillating mode of the attachment 320 can be set with regard to its frequency and phase in relation to the torsional oscillating mode of the measuring pipe 302 by suitable fixing of the following parameters: the ratio of $r_3$ to $r_2$ or $r_3$ to $r_1$, the distances of the transitions 328, 330 from the ends of the measured section 310, 312 on the inlet and outlet sides, or of the connecting plates 311, 313, and the wall thicknesses $t_3$, $t_1$, $t_2$. With a correspondingly suitable choice of the shape, the torsional oscillating mode of the attachment 320 then has the same frequency, but opposite phase in relation to the torsional oscillating mode of the measuring pipe 302, so that then the moment of torsion of the measuring pipe $M_{tR}$ occurring at the ends of the measured section 310, 312 on the inlet and outlet sides is equal and opposite to the moment of torsion $M_{tA}$ of the attachment 320 occurring there. The two moments of torsion compensate each other; the meter 301 is very well balanced at the ends of the measured section 310, 312 on the inlet and outlet sides.

FIG. 4 shows a further alternative embodiment of a mass flowmeter 401 according to the invention. The same, similar or similarly acting elements or assemblies of the example that is shown in FIG. 4 bear the same reference numerals as in FIG. 1, increased by 400.

FIG. 4 shows a Coriolis mass flowmeter 401 with a single, straight measuring pipe 402. The measuring pipe 402 is produced from one piece, but is functionally divided into a pipe extension 414 on the inlet side, a pipe extension 416 on the outlet side and the measured section in between, bounded by a measured-section inlet cross-sectional area 404 and a measured-section outlet cross-sectional area 406. A central axis 408 of the measuring pipe 402 is defined by their centre points 404a, 406a. The central axis 408 coincides here with the axis of rotational symmetry of the measuring pipe 402. Attached to the pipe extensions 414, 416 are the flanges for incorporating the meter 401 in a process pipeline system. The flanges are not represented in FIG. 4.

Connected to the measuring pipe 402 is an attachment 420, with the result that the attachment 420 surrounds the measuring pipe 402 in the region of the measured section on all sides. The attachment 420 is a rotationally symmetrical body, made up of three sub-bodies 422, 424, 426, which represent a first segment, on the inlet side, a second segment, on the outlet side, and a third, central segment of the attachment 420. Its axis of rotational symmetry coincides with the central axis 408 of the measuring pipe 402.

The segments on the inlet and outlet sides are each formed as a circular ring 422, attached to the measuring pipe 402 by means of radial, elongated connecting elements 423, and the central segment is formed here as a rigid hollow cylinder as connecting body 420. Altogether, the segments on the inlet and outlet sides have the form of a spoked wheel, the radial elongated connecting elements forming the spokes. By suitable choice of the thickness and shape of the spokes 423, the natural torsional oscillating mode of the attachment 420 can be set.

The segments 422, 424 in the form of spoked wheels may be produced for example by laser cutting from a solid disc.

With regard to the excitation system and the sensors, the same as was said in the description of FIG. 2 applies correspondingly.

FIG. 5 shows a further alternative embodiment of a mass flowmeter 501 according to the invention. The same, similar or similarly acting elements or assemblies of the example that is shown in FIG. 5 bear the same reference numerals as in FIG. 1, increased by 500.

In the exemplary embodiment that is shown in FIG. 5, the segments 522, 524 of the attachment 520 on the inlet and outlet sides are discs. The central segment 526 is configured as a hollow cylinder formed rotationally symmetrically with respect to the central axis 508 of the measuring pipe 502. Its wall thickness is thickened in its central part 527, so that a greater mass and greater rigidity are produced there in comparison with the outer parts 529, 529a. The outer parts 529, 529a are configured with thin walls and act as torsion springs, while the central part 527 acts as a mass. The torsional oscillating properties of the attachment 520 can be set here by variation of the extent of the outer parts 529, 529a in relation to the central part 527 and also by the amount of the thickening of the central part 527 and its mass.

With regard to the excitation system and the sensors, the same as was said in the description of FIG. 2 applies correspondingly.

FIG. 6 shows a further alternative embodiment of a mass flowmeter 601 according to the invention. The same, similar or similarly acting elements or assemblies of the example that is shown in FIG. 6 bear the same reference numerals as in FIG. 1, increased by 600.

FIG. 6 shows a Coriolis mass flowmeter 601 with a single, straight measuring pipe 602. The measuring pipe 602 is produced from one piece, but is functionally divided into a pipe extension 614 on the inlet side, a pipe extension 616 on the outlet side and the measured section in between, bounded by a measured-section inlet cross-sectional area 604 and a measured-section outlet cross-sectional area 606. A central axis 608 of the measuring pipe 602 is defined by their centre points 604a, 606a. The central axis 608 coincides here with the axis of rotational symmetry of the measuring pipe 602. Attached to the pipe extensions 614, 616 are the flanges 618, 618a for incorporating the meter 601 in a process pipeline system. The flanges are not represented in FIG. 6.

Connected to the measuring pipe 602 at the ends of the measured section are an attachment 625 on the inlet side and an attachment 627 on the outlet side, with the result that each of the attachments 625, 627 surrounds the measuring pipe 602 on all sides. The two attachments 625, 627 are arranged mirror-symmetrically with respect to the plane of mirror symmetry 650 of the measuring pipe 602 oriented perpendicularly in relation to the central axis 608. Each of the two attachments 625, 627 has rotational symmetry of order 6, the axis of rotational symmetry of which coincides with the central axis 608 of the measuring pipe 602. They are each formed as a circular ring attached to the measuring pipe 602 by means of six radial, elongated connecting elements 623. Altogether, the attachments on the inlet and outlet sides have the form of a spoked wheel with six spokes, the radial elongated connecting elements forming the spokes. By suitable choice of the thickness of the spokes 623, the natural torsional oscillating modes of the attachments 625, 627 can be set and consequently good balancing of the meter can be achieved, as described above.

The attachments 625, 627 in the form of spoked wheels may be produced for example by laser cutting from a solid disc. They may also be formed from beams, bars or hollow bodies.

Probably the simplest form in which a Coriolis mass flowmeter according to the invention can be realized is represented by the variant that is shown in FIG. 10. It can be understood as a further simplification of the variant that is shown in FIG. 6. The same, similar or similarly acting elements or assemblies of the example that is shown in FIG. 10 bear the same reference numerals as in FIG. 1, increased by 1000.

In the variant that is shown in FIG. 10, the attachments in the form of spoked wheels have been reduced to a pair of elongated elements 1023/1023', 1023a/1023a', respectively attached to the measuring pipe 1002 on the inlet side, at the beginning of the measured section, and on the outlet side, at the end of the measured section. Each pair of elongated elements 1023/1023', 1023a/1023a' is attached in such a way that it has rotational symmetry of order 2 with respect to the central axis 1008. The pairs of elongated elements 1023/1023', 1023a/1023a' are arranged mirror-symmetrically with respect to the plane of mirror symmetry 1050 of the measuring pipe 1002, oriented perpendicularly in relation to the central axis 1008. The vibrational properties of the pairs of elongated elements 1023/1023', 1023a/1023a' can be set by the length, width, mass and mass distribution within the elongated elements. For example, adjusting masses could be additionally attached to the free ends of the elongated elements 1023/1023', 1023a/1023a'.

The fastening of the pairs of elongated elements 1023/1023', 1023a/1023a' on the measuring pipe 1002 takes place for example by welding or screwing.

FIG. 7 shows a further alternative embodiment of a mass flowmeter 701 according to the invention. The same, similar or similarly acting elements or assemblies of the example that is shown in FIG. 7 bear the same reference numerals as in FIG. 1, increased by 700.

FIG. 7 shows a Coriolis mass flowmeter 701 with a single, straight measuring pipe 702. The central axis 708 of the measuring pipe 702 coincides here with the axis of rotational symmetry of the measuring pipe 702. Attached to the ends 710, 712 of the measuring pipe 702 on the inlet and outlet sides are the flanges 718, 718a for incorporating the meter 701 in a process pipeline system. The measured section extends here over the entire length of the measuring pipe between the flanges 718, 718a.

Connected to the measuring pipe 702 is an attachment 720, which is rotationally symmetrical of order 4 with respect to its axis of rotational symmetry, with the result that the attachment 720 surrounds the measuring pipe, and consequently here also the measured section 702, on all sides. The attachment 720 comprises a first segment 722, on the inlet side, a second segment 724, on the outlet side, and a third, central segment 726. Its axis of rotational symmetry coincides with the central axis of the measuring pipe 702.

The first segment 722, on the inlet side, and the second segment 724, on the outlet side, are formed by thin-walled hollow cylinders. The third, central segment 726 is a multipart composite body, which is configured with rotational symmetry of order 4 in relation to the central axis 708 of the measuring pipe. This body is formed as a cuboid, with approximately square end plates 750, 750a and four connecting elements 752, 754, 756, 758 forming the longitudinal edges of the cuboid, running parallel to the measuring pipe 702 and in the form of likewise cuboidal longitudinal beams. The end plates 750, 750a have centrally arranged round holes for leading the measuring pipe through. On the inlet and outlet sides, the hollow cylinders 722, 724 forming the first and second segments are welded onto the end plates 750, 750a; they could also be soldered on or connected by some other connecting technique. The cuboidal longitudinal beams 752, 754, 756, 758 are mechanically fastened to the plates 750, 750a, either welded, soldered or screwed.

Midway between the inlet end and outlet end and on the inlet and outlet sides, respective pairs of adjacent longitudinal beams 752, 754, 756, 758 are connected by cuboidal connecting elements arranged perpendicularly in relation to the direction of the longitudinal extent of the longitudinal beams, with the result that in each case a frame-like bracing 772, 770, 774, which is oriented perpendicularly in relation to the central axis of the measuring pipe, is produced.

Fastened to the central bracing 772 is the excitation system; attached to the two bracings on the inlet and outlet sides are the sensors for picking up the state of vibration of the pipe.

The diameter of the hollow-cylindrical first and second segments 722, 724 is less than the edge length of the square end plates 750, 752. The first and second segments 722, 724 act as torsion springs, the third segment 726 acts as a mass. The frame-like bracings 772, 770, 774 achieve the effect of increased rigidity of the third segment with low weight.

The connecting elements 752, 754, 756, 758 may also be formed as profiled rails or as hollow profiled beams.

Screwed onto the corners on the inlet side of the central segment 726 are cylindrical bodies 760, 762, 764, as adjusting masses. They are attached after final assembly of the meter and are selected in respect of weight and distance from the central segment 726 in such a way that the balancing is optimized. Depending on the requirement, adjusting masses may be attached at all eight corners, or only at some of the corners—as shown in FIG. 7.

The torsional oscillating properties of the attachment 720 can be set by the geometrical properties of the first and second segments 722, 724—that is to say their length, diameter and wall thickness—, by the geometrical properties of the central segment—in particular by its length and the edge length of the cuboid—and by the masses of the connecting elements 752, 754, 756, 758 and also by the additionally attached adjusting masses.

FIG. 8 shows a further alternative embodiment of a mass flowmeter 801 according to the invention. The same, similar or similarly acting elements or assemblies of the example that is shown in FIG. 8 bear the same reference numerals as in FIG. 1, increased by 800.

FIG. 8 shows a Coriolis mass flowmeter 801 with a single, straight measuring pipe 802. The central axis 808 of the measuring pipe 802 coincides here with the axis of rotational symmetry of the measuring pipe 802. Attached to the ends 810, 812 of the measuring pipe 802 on the inlet and outlet sides are the flanges 818, 818a for incorporating the meter 801 in a process pipeline system. The measured section, that is to say that region of the measuring pipe in which the interaction between the medium flowing through the measuring pipe and the measuring pipe wall takes place, extends here over the entire length of the measuring pipe between the flanges 818, 818a.

Connected to the measuring pipe 802 is an attachment 820, which is rotationally symmetrical of order 2 with respect to its axis of rotational symmetry, with the result that the attachment 820 surrounds the measuring pipe 802 on all sides. The attachment 820 comprises a first segment 822, on the inlet side, a second segment 824, on the outlet side, and a third, central segment 826. Its axis of rotational symmetry coincides with the central axis of the measuring pipe 802.

The first segment 822, on the inlet side, and the second segment 824, on the outlet side, are formed by thin-walled hollow cylinders. The third, central segment 826 is a multipart composite body, which is configured with rotational symmetry of order 2 in relation to the central axis 808 of the measuring pipe.

This body is formed as a cuboid, with approximately square end plates 850, 850a and two connecting elements 852, 854, in the form of elongated plates or hollow bodies and running parallel to the measuring pipe 802.

The connecting elements 852, 854 are respectively screwed to the end plates 850, 850a on the narrow sides of the latter. Their height corresponds to the height of the end plates 850, 850a. Altogether, the end plates 850, 850a together with the connecting elements 852, 854 form a rectangular frame.

The end plates 850, 850a have centrally arranged round holes for leading the measuring pipe through. On the inlet and outlet sides, the hollow cylinders 822, 824 forming the first and second segments are welded onto the end plates 850, 850a; they could also be soldered on.

The diameter of the hollow-cylindrical first and second segments 822, 824 is less than the edge length of the square end plates 850, 852. The first and second segments 822, 824 act as torsion springs, the third segment 826 acts as a mass.

The torsional oscillating properties of the attachment 820 can be set by the geometrical properties of the first and second segments 822, 824—that is to say their length, diameter and wall thickness—, by the geometrical properties of the central segment—in particular by its length and the edge lengths and also the ratio of width to height of the cuboid—and by the masses of the connecting elements 852, 854.

Altogether, the embodiment that is shown in FIG. 8 bears a similarity to the embodiment that is shown in FIG. 7. However, it can be produced even more easily than that embodiment. In particular if the connecting elements 852, 854 are configured as elongated hollow cuboids, the attachment can be constructed with the oscillating properties required for optimal balancing and nevertheless a low overall mass.

FIG. 11 shows a further alternative embodiment of a mass flowmeter 1101 according to the invention. The same, similar or similarly acting elements or assemblies of the example according to FIG. 11 bear the same reference numerals as in FIG. 1, increased by 1100.

FIG. 11 shows a Coriolis mass flowmeter 1101 with a single, straight measuring pipe 1102. The measuring pipe 1102 is produced from one piece, but is functionally divided into a pipe extension 1114 on the inlet side, a pipe extension 1116 on the outlet side and the measured section in between, bounded by a measured-section inlet cross-sectional area 1104 and a measured-section outlet cross-sectional area 1106. A central axis 1108 of the measuring pipe 1102 is defined by their centre points 1104a, 1106a. The central axis 1108 coincides here with the axis of rotational symmetry of the measuring pipe 1102. Attached to the pipe extensions 1114, 1116 are the flanges 1118, 1118a for incorporating the meter 1101 in a process pipeline system.

Connected to the measuring pipe 1102 is an attachment 1120, which is arranged outside the measuring pipe 1102. The attachment 1120 is a rotationally symmetrical body with a first segment 1122, on the inlet side, a second segment 1124, on the outlet side, and a third, central segment 1126. Its axis of rotational symmetry 1107 runs parallel to the central axis 1108 of the measuring pipe 1102, but does not coincide with it but instead runs at a distance from the central axis 1108 of the measuring pipe 1102.

The attachment 1120 consists of metal and is produced for example by a casting technique. Formed on at the same time between the central segment 1126 and the segments 1122, 1124 on the inlet and outlet sides are transitional parts 1128, 1130. The surface of the attachment 1120 shows a continuous transition between the three segments with correspondingly concavely and convexly shaped transitions, the central segment 1126 being convexly formed.

A rigid connection between the measuring pipe 1102 and the attachment 1120 is realized by welding a rigid plate 1111, 1113 onto the measuring pipe 1102 respectively on the inlet and outlet sides and welding the attachment 1120 onto the plates 1111, 1113. The connecting points 1110a, 1112a of the attachment 1120 to the measuring pipe 1102 lie within the measured section.

A further compensating part 1180 is attached to the measuring pipe 1102 to compensate for flexural and/or torsional forces. The compensating part is formed as an eccentric trough and is fastened to the measuring pipe 1102 at the inlet 1110 and outlet 1112 of the measured section, for example by welding or screwing.

The idea on which the arrangement as shown in FIG. 11 is based is that the part of the measuring pipe which is compensated by the at least one compensating part with respect to flexural and/or torsional forces and the part which is compensated by the attachment with respect to the moment of torsion may be congruent, or one of the two parts encloses the other. The larger of the two parts in each case defines the measured section. In the case of FIG. 11, the part which is compensated by the compensating part defines the measured section.

FIG. 13 shows a further alternative embodiment of a mass flow meter 1301 according to the invention. The same, similar or similarly acting elements or assemblies of the example that is shown in FIG. 13 bear the same reference numerals as in FIG. 1, increased by 1300.

FIG. 13 shows a Coriolis mass flowmeter 1301 with a single, straight measuring pipe 1302. The measuring pipe 1302 is produced from one piece, but is functionally divided into a pipe extension 1314 on the inlet side, a pipe extension 1316 on the outlet side and the measured section in between, bounded by a measured-section inlet cross-sectional area 1304 and a measured-section outlet cross-sectional area 1306. A central axis 1308 of the measuring pipe 1302 is defined by their centre points 1304a, 1306a. The central axis 1308 coincides here with the axis of rotational symmetry of the measuring pipe 1302. Attached to the pipe extensions 1314, 1316 are the flanges 1318, 1318a for incorporating the meter 1301 in a process pipeline system.

Connected to the measuring pipe 1302 is an attachment 1320, which surrounds the measuring pipe 1302 in the region of the measured section on all sides. The attachment 1320 is a rotationally symmetrical hollow body, made up of three hollow cylinders, which represent a first segment 1322, on the inlet side, a second segment 1324, on the outlet side, and a third, central segment 1326 of the attachment 1320. Its axis of rotational symmetry coincides with the central axis 1308 of the measuring pipe 1302.

The connection between the central segment 1326 and the segments 1322, 1324 on the inlet and outlet sides is produced by welded plates at transitions 1328, 1330. The inner radii $r_1$, $r_2$ of the segments 1322, 1324 on the inlet and outlet sides are smaller than the inner radius $r_3$ of the central segment 1326. On the other hand, the wall thickness $t_3$ of the central segment 1326 is greater than the wall thicknesses $t_1$, $t_2$ of the segments 1322, 1324 on the inlet and outlet sides.

The measuring pipe 1302 may, as customary in the prior art, consist of metal, for example titanium. The attachment 1320 may also consist of metal. It is welded onto the measuring pipe at the ends 1310, 1312 of the measured section on the inlet and outlet sides.

A further compensating part 1380 is attached to the measuring pipe 1302 to compensate for flexural and/or torsional forces. The compensating part is formed as a pipe and is fastened to the measuring pipe 1302 at connecting points 1310a and 1310b, for example by welding or screwing. The connecting points 1310a, 1312a of the compensating part 1380 to the measuring pipe 1302 consequently lie within the measured section.

The idea on which the arrangement as shown in FIG. 13 is based is that the part of the measuring pipe which is compensated by the at least one compensating part with respect to flexural and/or torsional forces and the part which is compensated by the attachment with respect to the moment of torsion may be congruent, or one of the two parts encloses the other. The larger of the two parts in each case defines the measured section. In the case of FIG. 13, the part which is compensated by the attachment defines the measured section.

A further possible configuration for this is shown by FIG. 14 in the mass flowmeter 1401 according to the invention. The same, similar or similarly acting elements or assemblies of the example that is shown in FIG. 14 bear the same reference numerals as in FIG. 1, increased by 1400.

FIG. 14 shows a Coriolis mass flowmeter 1401 with a single, straight measuring pipe 1402. The measuring pipe 1402 is produced from one piece, but is functionally divided into a pipe extension 1414 on the inlet side, a pipe extension 1416 on the outlet side and the measured section in between, bounded by a measured-section inlet cross-sectional area 1404 and a measured-section outlet cross-sectional area 1406. A central axis 1408 of the measuring pipe 1402 is defined by their centre points 1404a, 1406a. The central axis 1408 coincides here with the axis of rotational symmetry of the measuring pipe 1402. Attached to the pipe extensions 1414, 1416 are the flanges 1418, 1418a for incorporating the meter 1401 in a process pipeline system.

Connected to the measuring pipe 1402 is an attachment 1420, which surrounds the measuring pipe 1402 in the region of the measured section on all sides. The attachment 1420 is a rotationally symmetrical hollow body, made up of three hollow cylinders, which represent a first segment 1422, on the inlet side, a second segment 1424, on the outlet side, and a third, central segment 1426 of the attachment 1420. Its axis of rotational symmetry coincides with the central axis 1408 of the measuring pipe 1402.

The connection between the central segment 1426 and the segments 1422, 1424 on the inlet and outlet sides is produced by welded plates at transitions 1428, 1430. The inner radii $r_1$, $r_2$ of the segments 1422, 1424 on the inlet and outlet sides are smaller than the inner radius $r_3$ of the central segment 1426. On the other hand, the wall thickness $t_3$ of the central segment 1426 is greater than the wall thicknesses $t_1$, $t_2$ of the segments 1422, 1424 on the inlet and outlet sides.

The measuring pipe 1402 may, as customary in the prior art, consist of metal, for example titanium. The attachment 1420 may also consist of metal. It is welded onto the measuring pipe at the ends 1410, 1412 of the measured section on the inlet and outlet sides.

Attached to the measuring pipe 1402 as further compensating parts are four plates 1480a, 1480b, 1480c, 1480d, eccentrically with respect to the central axis 1408 on the measuring pipe. They bring about the effect of compensating for flexural and/or torsional forces on the measuring pipe 1402 in the way already proposed earlier. The plates 1480a, b, c, d are arranged in such a way that they lie within the measured section and within the central segment 1426 of the attachment 1420.

FIG. 12 shows a further alternative embodiment of a mass flowmeter 1201 according to the invention. The same, similar or similarly acting elements or assemblies of the example that is shown in FIG. 12 bear the same reference numerals as in FIG. 1, increased by 1200.

FIG. 12 shows a Coriolis mass flowmeter 1201 with a measuring pipe 1202 bent in an approximately double S-shaped manner. The measuring pipe 1202 is produced from one piece, but is functionally divided into a pipe extension 1214 on the inlet side, a pipe extension 1216 on the outlet side and the measured section in between, bounded by a measured-section inlet cross-sectional area 1204 and a measured-section outlet cross-sectional area 1206. A central axis 1208 of the measuring pipe 1202 is defined by their centre points 1204a, 1206a. Attached to the pipe extensions 1214, 1216 are the flanges 1218, 1218a for incorporating the meter 1201 in a process pipeline system.

Connected to the measuring pipe 1202 is an attachment 1220, which surrounds the measuring pipe 1202 in the region of the measured section on all sides. The attachment 1220 is a rotationally symmetrical hollow body, made up of three hollow cylinders, which represent a first segment 1222, on the inlet side, a second segment 1224, on the outlet side, and a third, central segment 1226 of the attachment 1220. Its axis of rotational symmetry coincides with the central axis 1208 of the measuring pipe 1202.

The connection between the central segment 1226 and the segments 1222, 1224 on the inlet and outlet sides is produced by welded plates at transitions 1228, 1230. The inner radii $r_1$, $r_2$ of the segments 1222, 1224 on the inlet and outlet sides are smaller than the inner radius $r_3$ of the central segment 1226. On the other hand, the wall thickness $t_3$ of the central segment 1226 is greater than the wall thicknesses $t_1$, $t_2$ of the segments 1222, 1224 on the inlet and outlet sides.

The measuring pipe 1202 may, as customary in the prior art, consist of metal, for example titanium. The attachment 1220 may also consist of metal. It is welded onto the measuring pipe at the ends 1210, 1212 of the measured section on the inlet and outlet sides.

The embodiment according to FIG. 12 is an example showing that the compensation of the moments of torsion by means of an attachment according to the invention is also possible in the case of complexly bent measuring pipes. It goes without saying that the measuring pipe could also be bent in a U-shaped, V-shaped or spiral manner.

The exemplary embodiments shown in FIGS. 1 to 14 do not represent an exhaustive selection of possible configurations of a Coriolis mass flowmeter according to the invention. Other combinations of various partial aspects of the Coriolis mass flowmeters that are shown in the exemplary embodiments are likewise intended to be covered by the present application.

The invention claimed is:

1. Coriolis mass flowmeter with a measuring pipe vibrating in coupled flexural and torsional modes, wherein an attachment which is formed rotationally symmetrically with respect to an axis of rotational symmetry and can be made to undergo torsional oscillations of the same frequency, but opposite phase, in relation to the torsional oscillating modes of the measuring pipe is mechanically connected to the measuring pipe and the axis of rotational symmetry of the attachment runs parallel to the straight line (central axis) defined by the centre points of the cross-sectional areas of the inlet and outlet of the measured section or coincides with this line.

2. Coriolis mass flowmeter according to claim 1, wherein the attachment is mirror-symmetrical with respect to a plane of symmetry oriented perpendicularly in relation to the axis of rotational symmetry and intersecting the central axis at the centre of the measured section.

3. Coriolis mass flowmeter according to claim 1, wherein at least one further compensating part is attached to the measuring pipe to compensate for flexural and/or torsional forces.

4. Coriolis mass flowmeter according to claim 1, wherein the attachment is connected to the measuring pipe on the inlet and outlet sides.

5. Coriolis mass flowmeter according to claim 4, wherein the attachment is connected to the measuring pipe at the ends of the measured section on the inlet and outlet sides.

6. Coriolis mass flowmeter according to claim 4, wherein the attachment is connected to the measuring pipe within the measured section.

7. Coriolis mass flowmeter according to claim 1, wherein the further compensating part is attached to the measuring pipe within the measured section.

8. Coriolis mass flowmeter according to claim 1, wherein the attachment encloses the measuring pipe at least in the region of the measured section.

9. Coriolis mass flowmeter according to claim 1, wherein the attachment is arranged outside the measuring pipe, but is connected to it.

10. Coriolis mass flowmeter according to claim 1, wherein the mass flowmeter comprises a single, straight measuring pipe.

11. Coriolis mass flowmeter according to claim 1, wherein the measuring pipe comprises a bent measuring pipe.

12. Coriolis mass flowmeter according to claim 11, wherein the measuring pipe is bent in a U- or S- or V-shaped manner.

13. Coriolis mass flowmeter according to claim 1, wherein the attachment comprises at least a first segment, on the inlet side, a second segment, on the outlet side, and a third, central segment, each segment being formed rotationally symmetrically with respect to the axis of rotational symmetry.

14. Coriolis mass flowmeter according to claim 13, wherein the transitions between the segments are formed in steps.

15. Coriolis mass flowmeter according to claim 13, wherein the transitions between the segments are formed continuously.

16. Coriolis mass flowmeter according to claim 1, wherein the torsional moment of area of the central segment is of a greater amount than the torsional moments of area of the segments on the inlet and outlet sides.

17. Coriolis mass flowmeter according to claim 16, wherein the segments on the inlet and outlet sides act as torsion springs and the central segment acts as an inert mass.

18. Coriolis mass flowmeter according to claim 17, wherein the frequency and phase of the torsional mode of oscillation of the attachment can be set by the ratio of the amounts of the torsional moments of area of the central segment and of the segments on the inlet and outlet sides and also by the position of the transitions between the central segment and the segments on the inlet and outlet sides.

19. Coriolis mass flowmeter according to claim 1, wherein the attachment is made to undergo torsional oscillations of the same frequency, but opposite phase, in relation to the torsional oscillations of the measuring pipe.

20. Coriolis mass flowmeter according to claim 1, wherein at least one segment of the attachment is a hollow body.

21. Coriolis mass flowmeter according to claim 1, wherein at least one segment of the attachment is a thin-walled hollow body.

22. Coriolis mass flowmeter according to claim 21, wherein the thin-walled hollow body is a hollow cylinder or a hollow cuboid.

23. Coriolis mass flowmeter according to claim 1, wherein at least one segment of the attachment is a multipart composite body.

24. Coriolis mass flowmeter according to claim 23, wherein the multipart composite body comprises elongated components which run parallel in relation to the axis of rotational symmetry and are held on plates running perpendicularly in relation to the measuring pipe axis.

25. Coriolis mass flowmeter according to claim 24, wherein the elongated components are profiled rails.

26. Coriolis mass flowmeter according to claim 24, wherein the elongated components are hollow bodies.

27. Coriolis mass flowmeter according to claim 1, wherein the segments on the inlet and outlet sides each comprise a circular ring attached to the measuring pipe by means of radial, elongated connecting elements and the central segment comprises a rigid connecting element.

28. Coriolis mass flowmeter according to claim 27, wherein the rigid connecting element is a hollow body.

29. Coriolis mass flowmeter according to claim 28, wherein the hollow body is a hollow cylinder.

30. Coriolis mass flowmeter according to claim 28, wherein the hollow body is a hollow cuboid.

31. Coriolis mass flowmeter according to claim 27, wherein the rigid connecting element is a multipart composite body.

32. Coriolis mass flowmeter according to claim 31, wherein the rigid connecting element comprises elongated components running parallel to the axis of rotational symmetry.

33. Coriolis mass flowmeter according to claim 32, wherein the elongated components are profiled rails or beams or bars.

34. Coriolis mass flowmeter according to claim 32, wherein the elongated components are hollow bodies.

35. Coriolis mass flowmeter according to claim 1, wherein the torsional oscillating properties of the attachment can be set by means of the dimensioning of the elongated connecting elements.

36. Coriolis mass flowmeter according to claim 1, wherein the excitation system is attached to the attachment.

37. Coriolis mass flowmeter according to claim 1, wherein sensors for sensing the oscillation are attached to the attachment.

38. Coriolis mass flowmeter according to claim 1, wherein adjusting elements for subsequent trimming are attached to the attachment.

39. Coriolis mass flowmeter according to claim 1, wherein the attachment comprises a first rigid plate, on the inlet side, and a second rigid plate, on the outlet side, which are attached to the measuring pipe and are connected to each other by means of a twistable connecting element.

40. Coriolis mass flowmeter according to claim 39, wherein the twistable connecting element is a hollow body.

41. Coriolis mass flowmeter according to claim 40, wherein the hollow body is a hollow cylinder or a hollow cuboid.

42. Coriolis mass flowmeter according to claim 39, wherein the twistable connecting element is a multipart composite body.

43. Coriolis mass flowmeter according to claim 42, wherein the twistable connecting element is formed by elongated components running parallel to the measuring pipe axis.

44. Coriolis mass flowmeter according to claim 43, wherein the elongated components are profiled rails or beams or bars.

45. Coriolis mass flowmeter according to claim 44, wherein the elongated components are hollow bodies.

46. Coriolis mass flowmeter with a measuring pipe vibrating in coupled flexural and torsional modes, wherein at least two attachments which are formed rotationally symmetrically with respect to a common axis of rotational symmetry and can be made to undergo torsional oscillations of the same frequency, but opposite phase, in relation to the torsional oscillating modes of the measuring pipe are mechanically connected to the measuring pipe and the common axis of rotational symmetry of the attachments runs parallel to the straight line (central axis) defined by the centre points of the cross-sectional areas of the inlet and outlet of the measured section or coincides with this line.

47. Coriolis mass flowmeter according to claim 46, wherein an attachment like a circular ring on the inlet side and one on the outlet side are respectively attached to the measuring pipe at the ends of the measured section on the inlet and outlet sides by means of radial, elongated connecting elements.

48. Coriolis mass flowmeter according to claim 47, wherein the elongated connecting elements are bars, beams or pipes.

49. Coriolis mass flowmeter according to claim 48, wherein the torsional oscillating properties of the attachment on the inlet and outlet sides can be set by means of the dimensioning of the elongated connecting elements.

50. Coriolis mass flowmeter according to claim 46, wherein the attachments are pairs of elongated elements.

51. Coriolis mass flowmeter according to claim 1, wherein the further compensating part is a rigid trough or a compensating pipe attached eccentrically with respect to the central axis.

52. Coriolis mass flowmeter according to claim 1, wherein cantilevered masses attached eccentrically with respect to the central axis are attached to the measuring pipe as further compensating parts.

* * * * *